United States Patent
Ito

(10) Patent No.: US 6,637,170 B2
(45) Date of Patent: *Oct. 28, 2003

(54) EXTERNAL WALL CONSTRUCTION, SEALING FIXTURE, EXTERNAL WALL PANEL, AND EXTERNAL WALL CONSTRUCTING METHOD

(75) Inventor: Hiroshi Ito, Nagoya (JP)

(73) Assignee: Nichiha Co., Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,350

(22) Filed: Aug. 8, 2001

(65) Prior Publication Data

US 2002/0023398 A1 Feb. 28, 2002

(30) Foreign Application Priority Data

Aug. 9, 2000 (JP) ........................................ 2000-241603

(51) Int. Cl.[7] .............................. E04B 2/00; E04B 5/00; E04B 9/00
(52) U.S. Cl. ................................ 52/506.06; 52/506.09; 52/509; 52/135; 403/381; 248/304; 248/220.21
(58) Field of Search ................... 52/506.06, 506.08, 52/506.09, 508, 509, 135, 220.1, 234, 235, 506.01, 506.05; 403/381; 248/300, 301, 304, 220.21

(56) References Cited

U.S. PATENT DOCUMENTS

| | | | | |
|---|---|---|---|---|
| 5,245,808 A | * | 9/1993 | Grunewald et al. | .... 52/204.593 |
| 6,098,364 A | * | 8/2000 | Liu | ............... 52/235 |
| 6,289,646 B1 | * | 9/2001 | Watanabe | ............. 52/235 |
| 6,315,489 B1 | * | 11/2001 | Watanabe | ........... 248/220.21 |
| 6,393,792 B1 | * | 5/2002 | Mowery et al. | ......... 52/506.05 |
| 6,421,968 B2 | * | 7/2002 | Degelsegger | ........... 52/204.62 |

FOREIGN PATENT DOCUMENTS

| | | | | |
|---|---|---|---|---|
| EP | 0550395 | * | 12/1992 | ........... E04F/13/14 |
| JP | 04-110840 | | 9/1992 | |
| JP | 5-32558 | | 4/1993 | |
| JP | 6-240804 | * | 8/1994 | ............. E04B/5/55 |
| JP | 6-257252 | * | 9/1994 | ............. E04B/9/24 |
| JP | 6-307059 | | 11/1994 | |
| JP | 8-302954 | | 11/1996 | |
| JP | 09-004099 | | 1/1997 | |
| JP | 2925984 | | 5/1999 | |
| JP | 11-159102 | | 6/1999 | |

* cited by examiner

*Primary Examiner*—Carl D. Friedman
*Assistant Examiner*—Chi Q. Nguyen
(74) *Attorney, Agent, or Firm*—Oblon, Spivak, McClelland, Maier & Neustadt, P.C.

(57) ABSTRACT

An external wall construction capable of inhibiting water penetration thereinto includes a securing metal fitting installed at an upper side portion and a lower side portion of an external wall panel. The external wall panel is mounted on an underlayment. The external wall panel has a notched recess formed on left and right side portions along the vertical direction. A sealing fixture is arranged between the adjacent left and right external wall panels. The sealing fixture has a base plate portion fixed to the underlayment, a rising plate portion erected at the base plate portion, and a front plate portion arranged at the rising plate portion, wherein a front resilient material is provided at the front face of the front plate portion. The front resilient material and the front plate portion are engaged in the notched recess of the external wall panel.

9 Claims, 21 Drawing Sheets

FIG.19  *PRIOR ART*

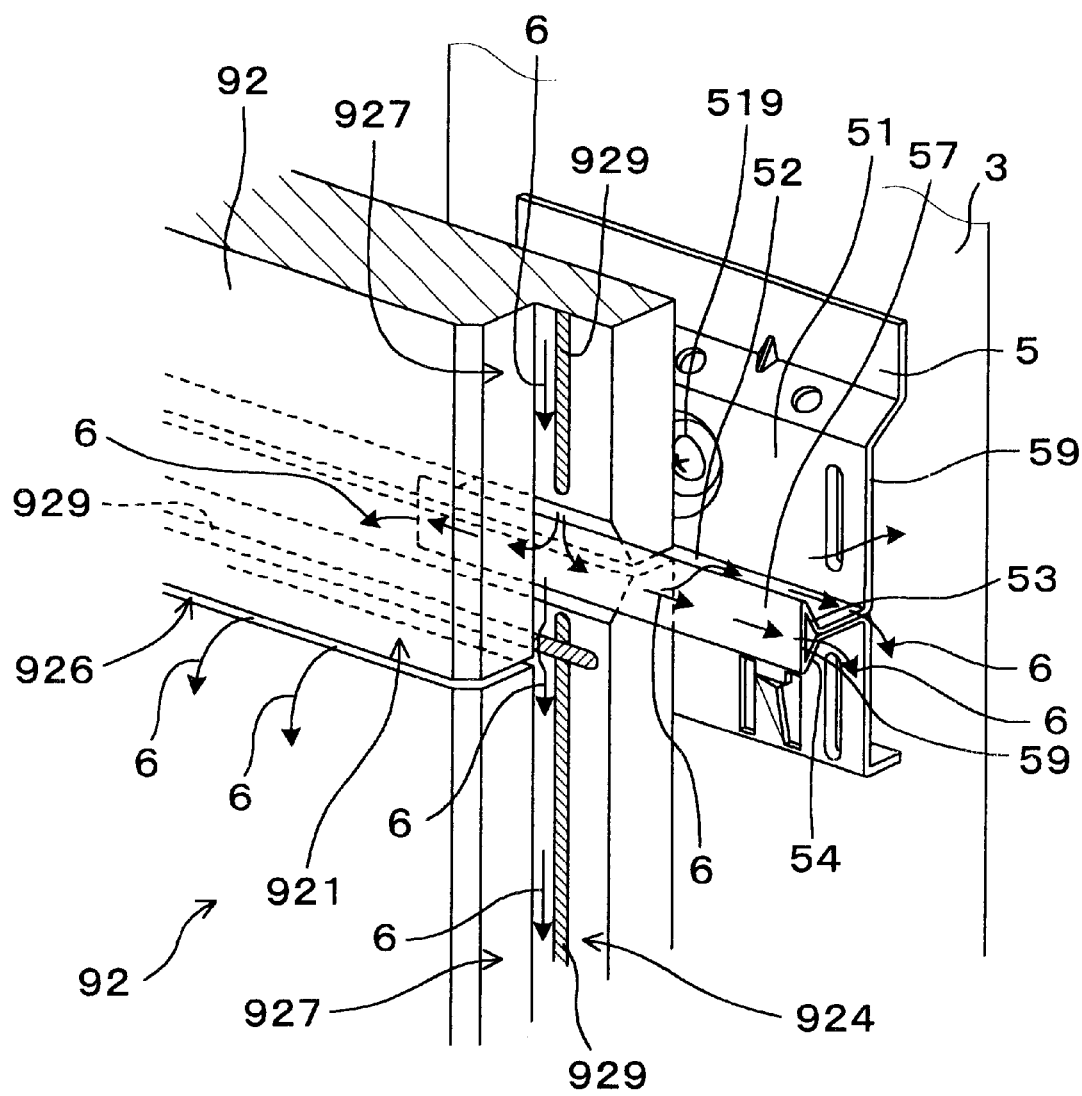
FIG.21  *PRIOR ART*

EXTERNAL WALL CONSTRUCTION, SEALING FIXTURE, EXTERNAL WALL PANEL, AND EXTERNAL WALL CONSTRUCTING METHOD

CROSS-REFERENCES TO RELATED APPLICATIONS

The present application claims priority under 35 U.S.C. §119 to Japanese Patent Application No. 2000-241603, filed on Aug. 9, 2000, entitled "EXTERNAL WALL CONSTRUCTION, SEALING FIXTURE, EXTERNAL WALL PANEL, AND EXTERNAL WALL CONSTRUCTING METHOD". The contents of this application are incorporated herein by reference in their entirety.

BACKGROUND OF THE INVENTION

1. Field of the Invention

The present invention relates to an external wall construction for mounting an external wall panel on an underlayment using a securing metal fitting and further relates to a sealing fixture, an external wall panel, and an external wall constructing method used for the external wall construction.

2. Discussion of the Background

Conventionally, there has been known an external wall construction: wherein a securing metal fitting is engagingly locked to an upper underlying tongue portion formed at an upper side portion of an external wall panel disposed in a lower position and a lower overlying tongue portion formed at a lower side portion of an external wall panel disposed in a higher position, and vertical aligned external wall panels are fixed to an underlayment. In the external wall construction, an external wall panel having a four side (left, right, upper and lower sides) shiplap structure or a left-and-right side shiplap structure is used from the viewpoints of appearance design properties or constructing properties or the like.

For example, an external wall construction 9 using an external wall panel 92 having the four side shiplap structure shown in FIG. 19 is shown in FIG. 20. In FIG. 20, a front side surface of the external wall panel 92 arranged at an upper right position is indicated by a double-dot chain line.

As shown in FIG. 19, the external wall panel 92 has an upper underlying tongue portion 922, a lower overlying tongue portion 921, and a lateral underlying tongue portion 924 and a lateral overlying tongue portion 923 that are provided at a right side portion and at a left side portion, respectively. As shown in FIG. 20, during constructing, the lower overlying tongue portion 921 of the upper external wall panel 92 is superposed on the upper underlying tongue portion 922 of the lower external wall panel 92, and the lateral overlying tongue portion 923 of the right external wall panel 92 is superposed on a lateral underlying tongue portion 924 of the left exterior wall panel 92.

In addition, as shown in FIG. 19, a caulking material 929 is attached on the upper underlying tongue portion 922 and lateral underlying tongue portion 924 of the external wall panel 92. Over this caulking material 929, as shown in FIG. 20, the rear surfaces of the lower overlying tongue portion 921 and lateral overlying tongue portion 923 of another external wall panel 92 are pressed, thereby preventing water penetration into the external wall construction 9 from the joint clearance portion 927 of each external wall panel 92.

In addition, in the external wall construction 9 with a four side shiplap, as shown in FIG. 20, the caulking material 929 is covered with the lower overlying tongue portion 921 and the lateral overlying tongue portion 923, and is not exposed in front of the exterior wall. Therefore, an external wall construction with an excellent appearance design properties can be obtained.

In addition, in the external wall construction 9, a securing metal fitting 5 (refer to FIG. 5) is installed at an upper underlying tongue portion 922 and a lower overlying tongue portion 921 of the external wall panel 92, and each of the external wall panels 92 is fixed to an underlayment 3 such as a furring strip (refer to FIG. 6). That is, a lower panel engaging portion 54 of the securing metal fitting 5 is engagingly locked with the upper underlying tongue portion 922 of the lower exterior wall panel 92, the upper external wall panel 92 is supported by means of a support portion 52, and the upper panel engaging portion 53 is engagingly locked with the lower overlying tongue portion 921 of the upper external wall panel 92.

In addition, there is a problem that, although the caulking material 929 is attached on the external wall construction 9, rainwater 6 or the like may penetrate into the construction.

As shown in FIG. 20, the rainwater 6 penetrating into the joint clearance portion 927 is inhibited from moving in a transverse direction (to the right side in FIG. 20) by means of the caulking material 929, and drops downwardly through the joint clearance portion 927. Then, the rainwater 6 drops further through the joint clearance portion 927 of the external wall panel 92 that is disposed downwardly.

However, the caulking material 929 applied to the lateral underlying tongue portion 924 of the external wall panel 92 is discontinuous at a rear surface joint clearance portion 928 between the upper and lower external wall panels 92. Therefore, when the rainwater 6 dropping through the joint clearance portion 927 reaches the rear surface joint clearance portion 928 of the upper and lower external wall panel 92, a part of the rainwater 6 may penetrate into the external wall construction 9.

In addition, as shown in FIG. 21, in the case where the securing metal fitting 5 is arranged at the corner of the external wall panel 92, the rainwater 6 dropping through the joint clearance portion 927 passes through a front face of a front flat plate 57 of the securing metal fitting 5, and moves further to the joint clearance portion 927 that is disposed downwardly.

However, as shown in FIG. 21, there is apprehension that a part of the rainwater 6 flows transversely through the front face of the front flat plate 57, drops from a side end 59 to the upper underlying tongue portion 922 of the lower external wall panel 92, and further, penetrates into the rear side of the external wall panel 92.

In addition, a part of the rainwater 6 moving transversely through the front flat plate 57 travels over the upper panel engaging portion 53, moves onto the support portion 52, and further, moves to the left and right side ends 59. Then, this rainwater 6 also penetrates from the side end 59 of the securing metal fitting 5 to the rear side of the external wall panel 92.

In this manner, the external wall panel 92 or underlayment 3 may be corroded or degraded.

The rainwater 6 penetrating from the joint clearance portion 926 between the upper and lower external wall panels 2 is inhibited from upward moving by the caulking material 929 in a transverse direction attached on the upper underlying tongue portion 922, and is discharged forwardly as is (FIG. 21).

SUMMARY OF THE INVENTION

An object of the present invention is to provide an external wall construction capable of inhibiting water penetration into the external wall construction reliably; and a sealing fixture, an external wall panel, and an external wall constructing method, which are used for the external wall construction.

According to one aspect of the present invention, an external wall construction includes a securing metal fitting installed at the upper side portion and the lower side portion of an external wall panel, and the external wall panel mounted on an underlayment, wherein:

the external wall panel includes a notched recess formed on a left side portion and a right side portion along the vertical direction;

a sealing fixture is arranged between the adjacent left and right external wall panels;

the sealing fixture has a base plate portion fixed to the underlayment, a rising plate portion erected at the base plate portion, and a front plate portion arranged at the rising plate portion, wherein a front resilient material is provided at the front face of the front plate portion; and, the front resilient material and a front plate portion are engaged into the notched recess of the external wall panel.

In the external wall construction, the front plate portion and front resilient material of the sealing fixture arranged between the two adjacent external wall panels are engaged into both of the notched recesss of the two external wall panels. Thus, the front resilient material comes into closely contact with both of the front inner surfaces of the notched recesss of the two external wall panels.

Thus, the joint clearance portion at the surface sides of the left and right external wall panels is sealed from the rear side. Therefore, no rainwater penetrates from the joint clearance portion into the external wall construction such as back surface of the external wall panel or an underlayment.

In this way, with the external wall construction, the rainwater can be reliably prevented from penetrating into the external wall construction, and the external wall panel, the underlayment and the like can be reliably prevented from being corroded or degraded.

In particular, the sealing fixture is continuously arranged over the vertical direction of the external wall construction, whereby rainwater penetration can be prevented more reliably without providing a room for such rainwater penetration.

The sealing fixture can be in a state that the base plate portion is fixed to the underlayment, and the rising plate portion abuts against the side face which is close to the back surface in comparison with the notched recess in the external wall panel. Thus, the displacement in the transverse direction of the external wall panel can be prevented.

As described according to the present invention, there can be provided an external wall construction capable of preventing water penetration into the external wall construction reliably.

According to another aspect of the present invention, a sealing fixture used for an external wall construction in which an external wall panel having a notched recess formed on a left side portion and a right side portion along the vertical direction is fixed to the underlayment by installing the securing metal fitting on an upper side portion and a lower side portion of the external wall panel and arranged between the adjacent left and right external wall panels, wherein:

the sealing fixture has a base plate portion fixed to the underlayment, a rising plate portion erected at the base plate portion, and a front plate portion arranged at the rising plate portion, wherein a front resilient material is provided at the front face of the front plate portion; and, the front resilient material and the front plate portion are formed to be engaged into the notched recesss of the external wall panel (refer to FIG. 4).

When the external wall panel is constructed on the underlayment by using the sealing fixture, the front resilient material is engaged into the notched recesss in the adjacent two external wall panels. Thus, the front resilient material comes into closely contact with the front inner surface of the notched recesss at the two external wall panels.

In this way, as described, at the joint clearance portion of the left and right external wall panels are sealed from the rear side, the rainwater can be reliably prevented from penetrating into the external wall construction. Thus, the external wall panel, the underlayment and the like can be reliably prevented from being corroded or degraded.

In the sealing fixture, the base plate portion can be fixed to the underlayment and the rising plate portion can be abutted against the side face of the lateral underlying tongue portion of the external wall panel. Thus, the displacement in the lateral direction of the external wall panel can be prevented.

As described, according to the present invention, it is possible to provide the sealing fixture capable of preventing water penetration into the external wall construction reliably.

According to another aspect of the present invention, an external wall panel used for the external wall construction includes a notched recess formed at a left side portion and a right side portion along the vertical direction, wherein the notched recess is formed so that a front resilient material and a front plate portion of the sealing fixture are engaged into the notched recess.

In this manner, a part of the front resilient material of the sealing fixture is engaged into the notched recesss, whereby the joint clearance portion of the external wall panel can be sealed from the back surface. That is, the joint clearance portion can be sealed by contacting the front resilient material to the frontward inner face of the notched recess closely.

Thus, by using the external wall panel, water penetration into the external wall construction can be reliably prevented.

According to the other aspect of the present invention, a method for constructing an external wall construction is as follows.

That is, an external wall constructing method for constructing the external wall construction includes:

a first step of installing a securing metal fitting at an upper side portion and a lower side portion of an external wall panel, and installing an external wall panel of a first column on an underlayment;

a second step of installing the sealing fixture on the underlayment at the left side portion or the right side portion of the external wall panel of the first column; and a third step of disposing an external wall panel of the second column to the underlayment so that the sealing fixture is sandwiched between the external wall panel of the first column and the external wall panel of the second column, wherein a securing metal fitting is installed at the upper side portion and the lower side portion of the external wall panel of the second column; wherein:

in the second step the front resilient material and a front plate portion of the sealing fixture is engaged into the notched recess of the external wall panel; and, in the third step the front plate portion and the front resilient material of the sealing fixture is engaged into the notched recess of the external wall panel of the second column.

In this case, the front plate portion and the front resilient material can be easily engaged into the notched recess of the external wall panel. In addition, after constructing, the front resilient material is in a compressed state gradually expands, and extends sufficiently into a space of the notched recess of the external wall panel. In this way, the front resilient material presses and seals the joint clearance portion of the left and right external wall panels from the rear side, thereby it is possible to prevent rainwater penetration reliably.

Therefore, according to the present external wall constructing method, there can be provided an external wall construction for preventing water penetration into the construction in a easily and reliably way.

In addition, at the second step, the sealing fixture can be installed in a state that the rising plate portion is abutted against the side face which is close to the back surface in comparison with the notched recess at the external wall panel of the first column. Thus, the lateral alignment of the sealing fixture can be easily performed.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which:

FIG. 21 is an illustrative view illustrating problems with an external wall construction in another conventional example.

DESCRIPTION OF THE PREFERRED EMBODIMENTS

Figure 1:
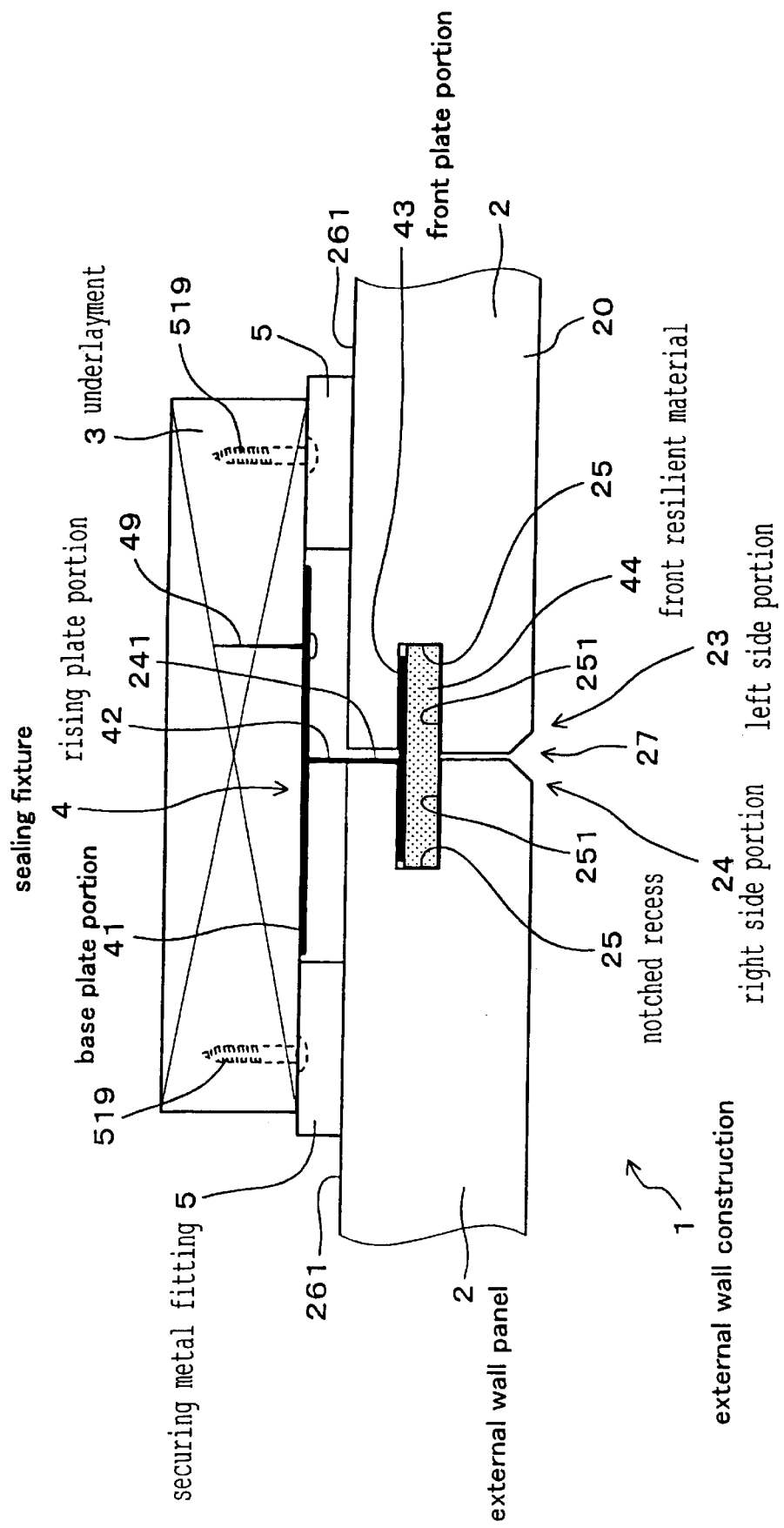
FIG. 1 is a lateral cross section of an external wall construction in a first embodiment.

The preferred embodiments will now be described with reference to the accompanying drawings, wherein like reference numerals designate corresponding or identical elements throughout the various drawings.

In the specification, an outer direction of a building denotes a "front side", and an inner direction of a building denotes a "back side". With respect of the sealing fixture and securing metal fitting, in a state in which the fixture is mounted on an underlayment, an outer direction of the building denotes a "front side" and an inner direction of the building denotes a "back side".

Figure 3:
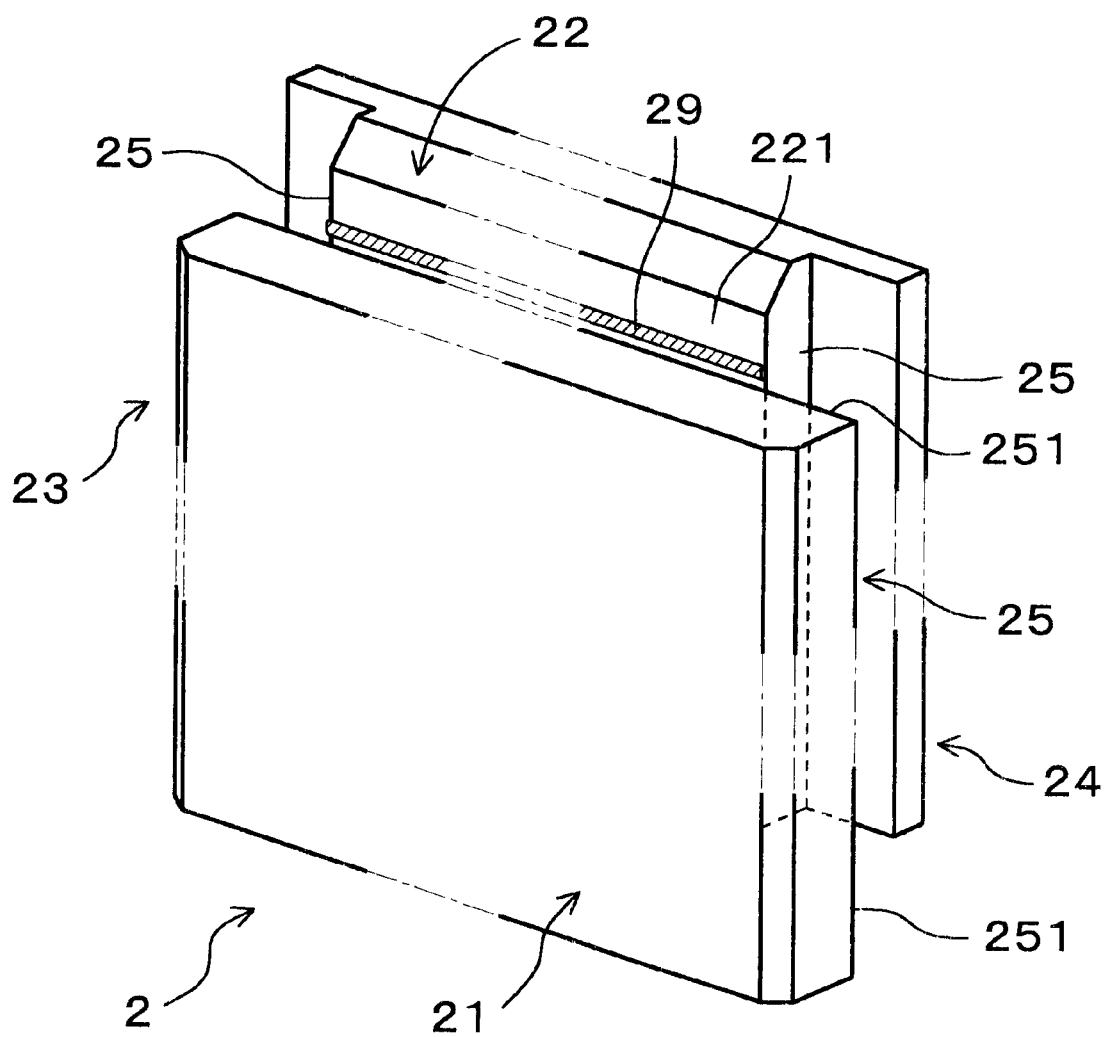
FIG. 3 is a perspective view of the external wall panel in the first embodiment.

The notched recess provided at the external wall panel is cut out from the side to the center of the external wall panel at the left side portion and right side portion of the external wall panel (refer to FIG. 1 and FIG. 3).

The securing metal fitting has a shape shown below, for example. That is, the fixture has a fixing plate portion abutting against the back surface of the external wall panel that is vertically arranged, a support portion forwardly erected over the full length of the fixing plate portion, an upper panel engaging portion that is bent in an oblique upward direction from the front end of the support portion, a lower panel engaging portion that is bent in an oblique downward direction from the front end of the support portion and a front flat plate contiguously provided between the tip ends of the upper panel engaging portion and a lower panel engaging portion (Refer to FIG. 5).

It is preferable that the sealing fixture includes a rear resilient material disposed on a front face of the base plate portion, the rear resilient material being in closely contact with the back surface of the external wall panel.

In this manner, there can be provided an external wall construction capable of more reliably preventing water penetration into the construction.

Figure 11:
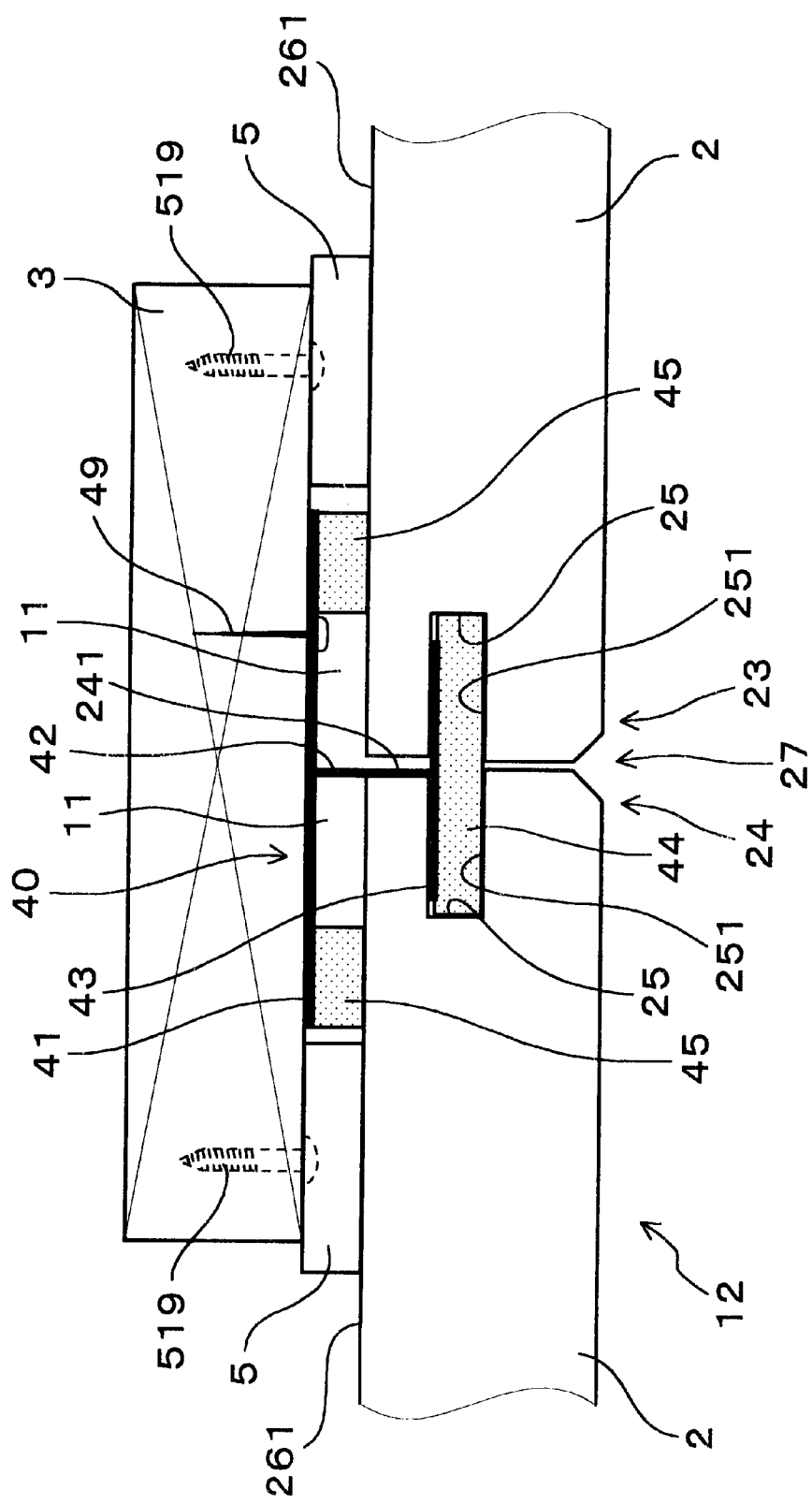
FIG. 11 is a lateral cross section of an external wall construction in the second embodiment.
Figure 13:
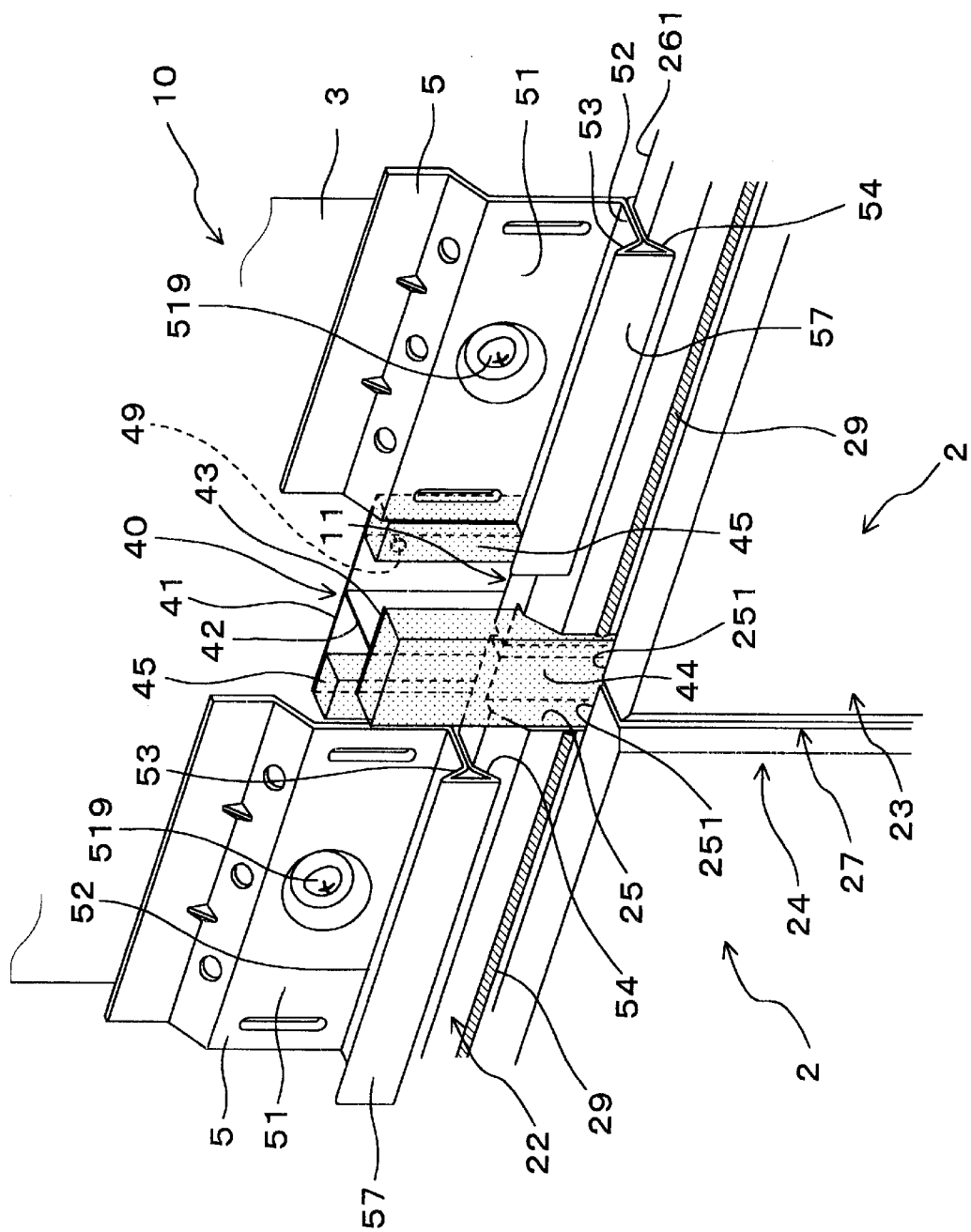
FIG. 13 is a perspective view of the external wall construction in the second embodiment.

That is, according to the external wall construction, a water passage is formed by the base plate portion of the sealing fixture, the rear resilient material, the rising plate portion, the front plate portion and the external wall panel (refer to FIG. 11 and FIG. 13).

Thus, even if water penetration cannot be prevented by the front resilient material of the front plate portion, and rainwater penetrates from the joint clearance portion of the external wall panel, such rainwater can be dammed by the rear resilient material. Then the rainwater drops through the joint clearance portion and the water penetration into the inner portion of the external wall panel can be prevented.

It is preferable that the front resilient material and the rear resilient material are made from foam material.

In this manner, an external wall construction for preventing rainwater penetration more reliably can be provided.

As a form, there is a rubber foam that consists of an EPDM (an ethylene propylene rubber) and the like, or a synthetic resin foam that consists of polyethylene and the like, for example.

It is preferable that the base plate portion is sandwiched between a rear portion of the securing metal fitting and the underlayment to secure the sealing fixture to the underlayment together with the securing metal fitting.

In this manner, an external wall construction with an excellent constructing efficiency can be provided. In addition, even in the case where a width of the underlayment is small, the sealing fixture and securing metal fitting can be reliably fixed to the underlayment.

It is preferable that the left side portion and the right side portion of the external wall panel are fastened to the underlayment by means of the sealing fixture.

Figure 17:
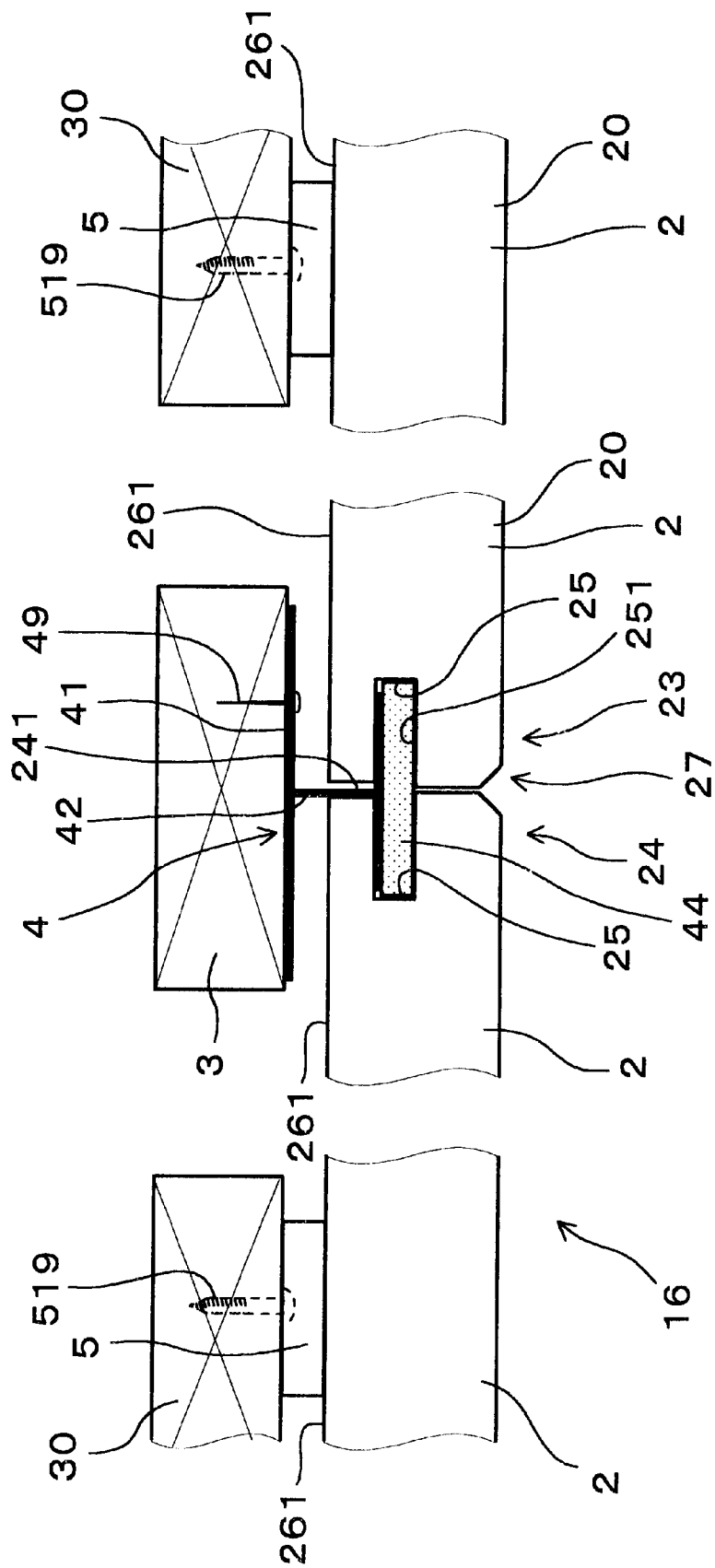
FIG. 17 is a lateral cross section of an external wall construction in a sixth embodiment.

That is, at the left and right joint portions of the external wall panel, only the sealing fixture is installed without using the securing metal fitting, water penetration into the external wall construction is prevented by the sealing fixture, and the left and right external wall panels is jointed to each other (refer to FIG. 17).

In this manner, the sealing fixture can play two roles, i.e., prevention of water penetration into the external wall construction and jointing of the left and right external wall panels simultaneously.

In addition, since it is sufficient if the width of the underlayment has the width of the sealing fixture or the securing metal fitting, it is efficient when the external wall panel is applied at a framework in which a number of underlayments having small widths is installed.

The external wall panel of the first column installed at the first step of the external wall constructing method is referred to as an external wall panel that configures one column in any longitudinal direction in the external wall construction. In addition, the external wall panel of the second column mounted at the second step is referred to as an external wall panel of one column in a longitudinal direction installed adjacent to the external wall panel of the first column. In addition, the first column and second column may have one or more external wall panels respectively.

It is preferable that the sealing fixture includes a rear resilient material arranged at the front face of the base plate portion, wherein:

in the second step the rear resilient material and base plate portion of the sealing fixture are inserted between the back surface of the external wall panel of the first column and the underlayment, and the rear resilient material is brought into closely contact with the back surface of the external wall panel; and in the third step the back surface of the external wall panel of the second column is brought into closely contact with the rear resilient material of the sealing fixture.

In this manner, as described, an external wall constructing method for preventing water penetration into the external wall construction more reliably can be provided.

It is preferable that at either or both of the second step and the third step the base plate portion of the sealing fixture is installed to be superimposed backwardly of the securing metal fitting, whereby the sealing fixture and the securing metal fitting are fixed to the underlayment at the same time.

In this manner, an external wall constructing method with an excellent efficiency can be provided.

In addition, even in the case where the width of the underlayment is small, the sealing fixture and securing metal fitting can be reliably fixed to the underlayment.

Embodiment 1

An external wall construction according to embodiments of the present invention will be described with reference to FIG. 1 to FIG. 10.

FIG. 1 is a lateral cross section illustrating an external wall construction 1 of the present embodiment, wherein a joint portion of the left and right external wall panels 2 is in the center.

Figure 2:
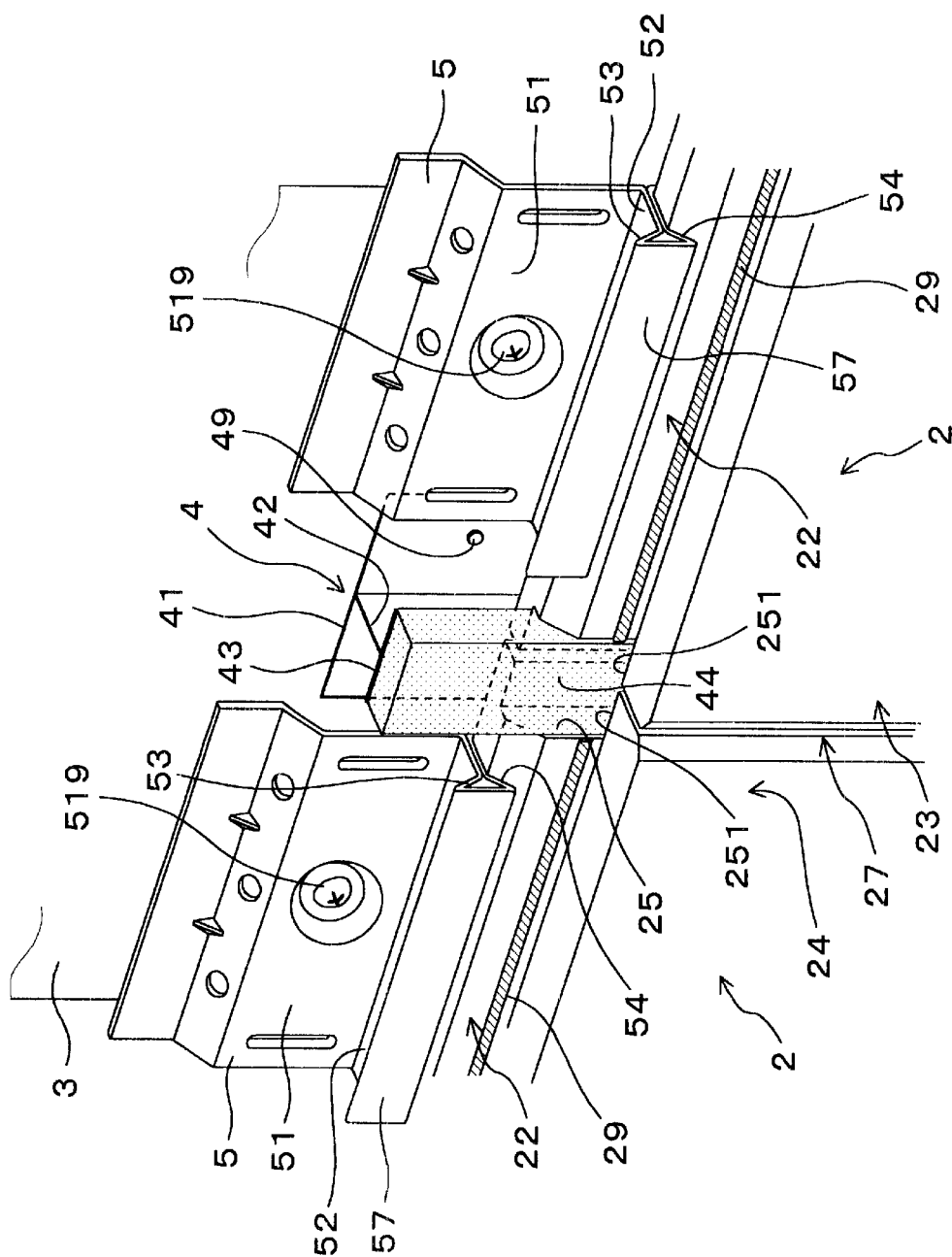
FIG. 2 is a perspective view of the external wall construction in the first embodiment.
Figure 9:
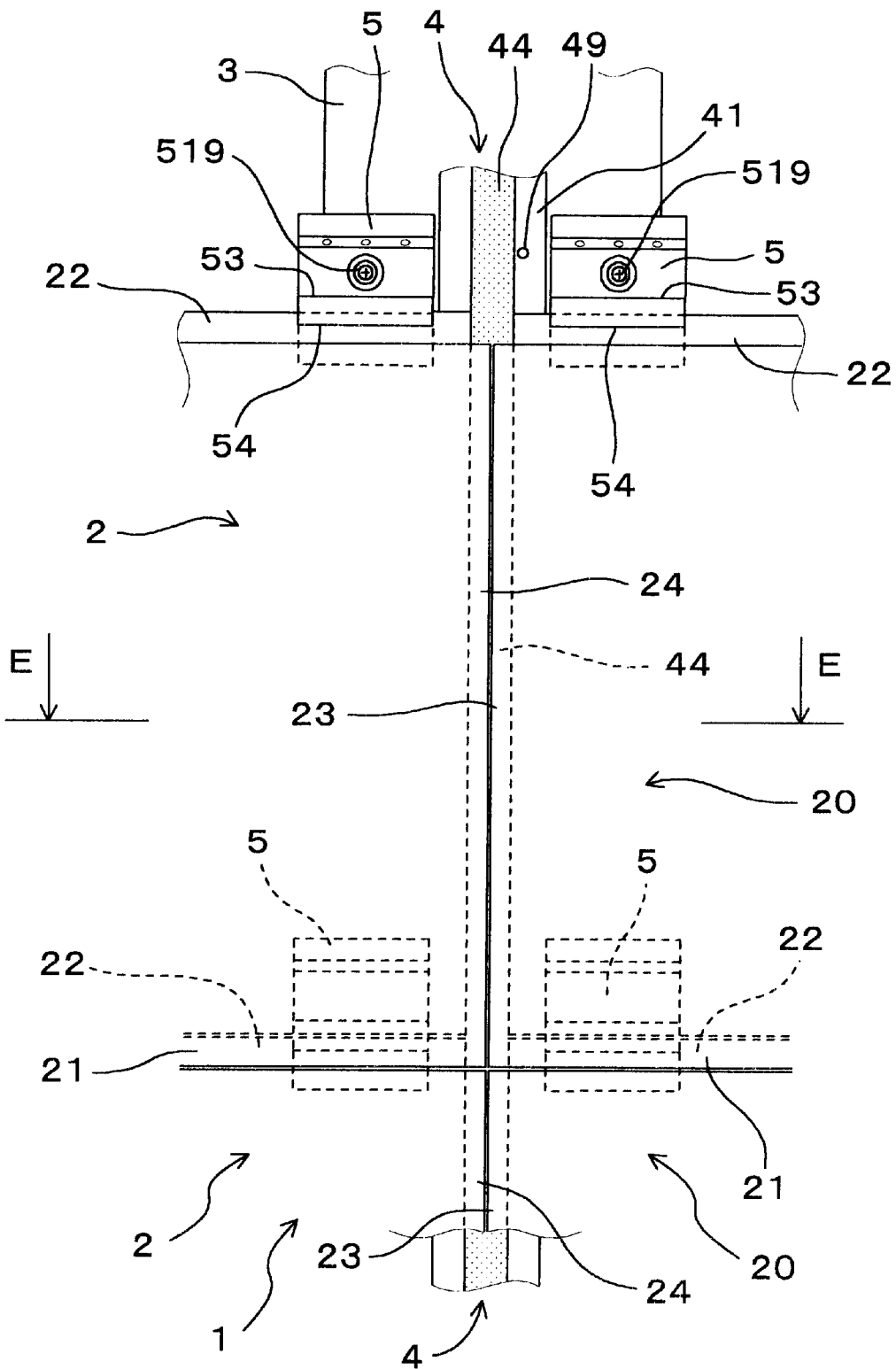
FIG. 9 is a front view showing a state of completion of the third step of the external wall constructing method according to the first embodiment.

In the external wall construction 1 of the present embodiment, a securing metal fitting 5 is installed at the upper side portion and lower side portion of an external wall panel 2 (FIG. 3), i.e., at an upper underlying tongue portion 22 and a lower overlying tongue portion 21, as shown in FIG. 1, FIG. 2 and FIG. 9, and the external wall panel 2 is mounted on the underlayment 3.

The external wall panel 2 has a notched recess 25 formed at a left side portion 23 and a right side portion 24 along the vertical direction, as shown in FIG. 3.

As shown in FIG. 1 and FIG. 2, the sealing fixture 4 (FIG. 4) is arranged between the adjacent left and right external wall panels 2.

Figure 4:
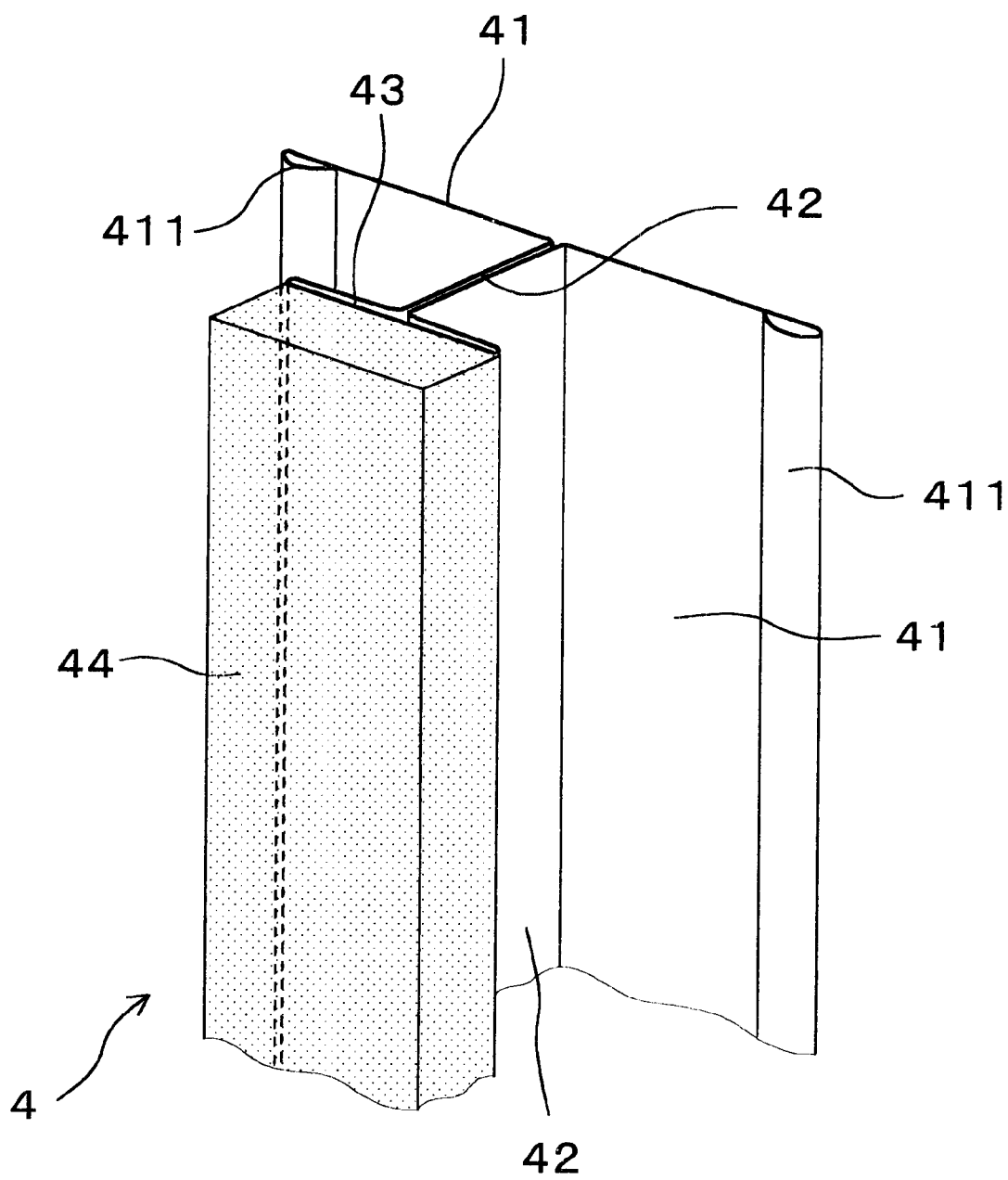
FIG. 4 is a perspective view of a sealing fixture in the first embodiment.

The sealing fixture 4 has a base plate portion 41 fixed to the underlayment 3, a rising plate portion 42 erected on the base plate portion 41, and a front plate portion 43 arranged at the rising plate portion 42, as shown in FIG. 1 and FIG. 4. In addition, a front resilient material 44 is provided at the front face of the front plate portion 43.

The front resilient material 44 and the front plate portion 43 are inserted into the notched recess 25 of the external wall panel 2.

Further, the sealing fixture 4 is continuously arranged over the vertical direction of the external wall construction 1 (FIG. 9).

As shown in FIG. 1 and FIG. 3, the notched recess 25 is cut out from the side to the center of the external wall panel 2 at the left side portion 23 and the right side portion 24 of the external wall panel 2.

In addition, as shown in FIG. 3, the external wall panel 2 has an upper underlying tongue portion 22 and a lower overlying tongue portion 21, respectively at the upper side portion and the lower side portion. Further, a caulking material 29 is attached on the vicinity of the lower end of a flat front face 221 at the upper underlying tongue portion 22 of the external wall panel 2.

Figure 6:
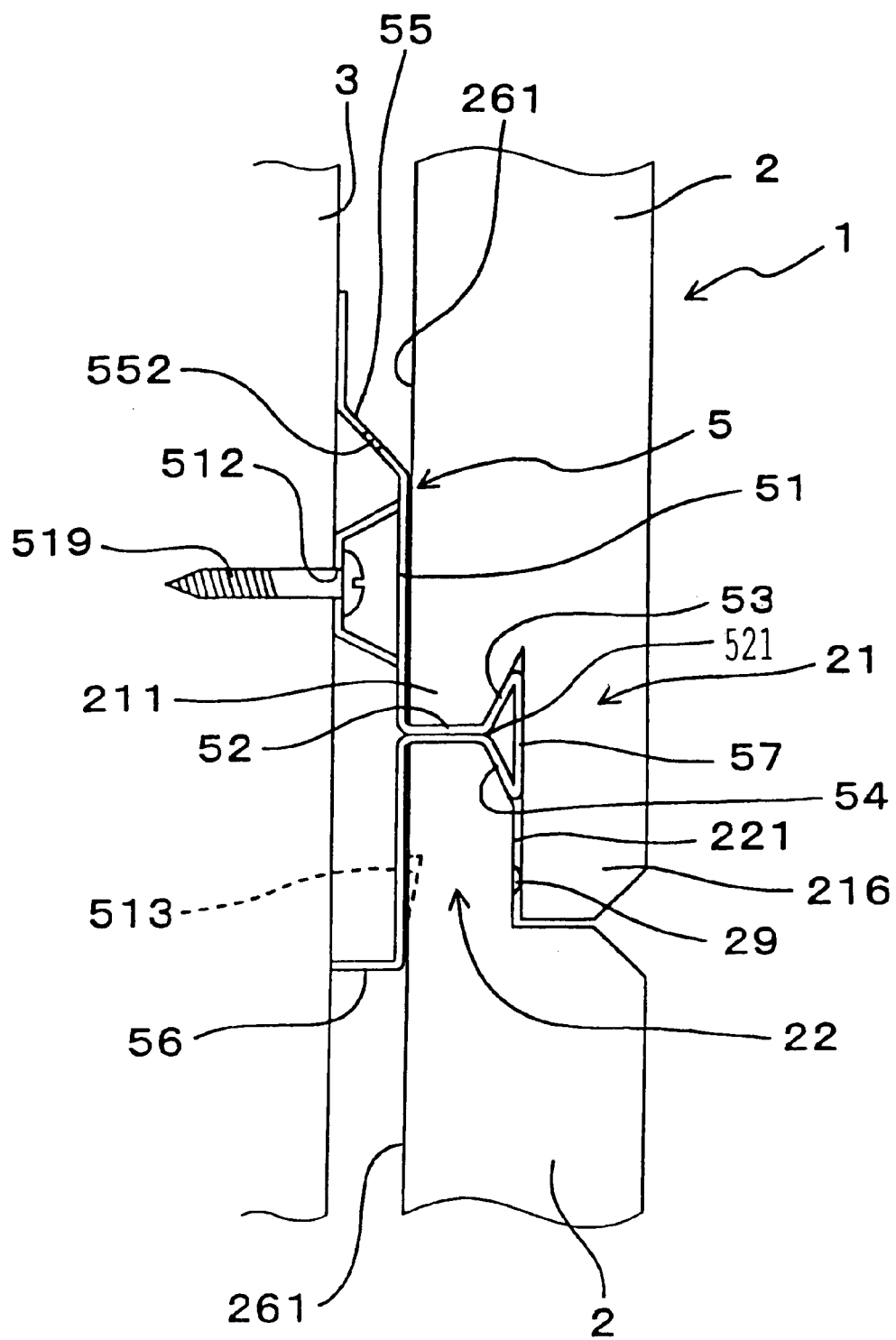
FIG. 6 is a longitudinal cross section illustration of an external wall construction of a vertical shiplap joint portion in the first embodiment.

The external wall construction 1 is constructed by jointing the upper underlying tongue portion 22 of the lower external wall panel 2 and the lower overlying tongue portion 21 of the upper external wall panel 2, with regard to the vertical direction (FIG. 6).

As shown in FIG. 4, in the sealing fixture 4, the base plate portion 41, the rising plate portion 42, and the front plate portion 43 are integrally formed by bending a metal plate such as stainless steal.

At the base plate portion 41, a turned-up portion 411 at which the left and right ends are returned forwardly is provided to ensure strength of the base plate portion. In addition, from the center portion of the left and right of the base plate portion 41, a rising plate portion 42 erected by being bent in approximate 90 degrees forwardly is provided.

From the front end of the rising plate portion 42, a front plate portion 43 formed in substantially parallel to the base plate portion 41 by being bent in approximate 90 degrees is provided.

The front resilient material 44 is pasted at the front face of the front plate portion 43. The front elastic material 44 is a foam body with closed cells that consist of EPDM or the like.

A shape of the sealing fixture 4 is simplified in FIGS. 1, 2, 10B and 10C. Similarly, a shape of sealing fixture 4 is simplified in FIGS. 11, 13 to 18 which will be described later.

Figure 5:
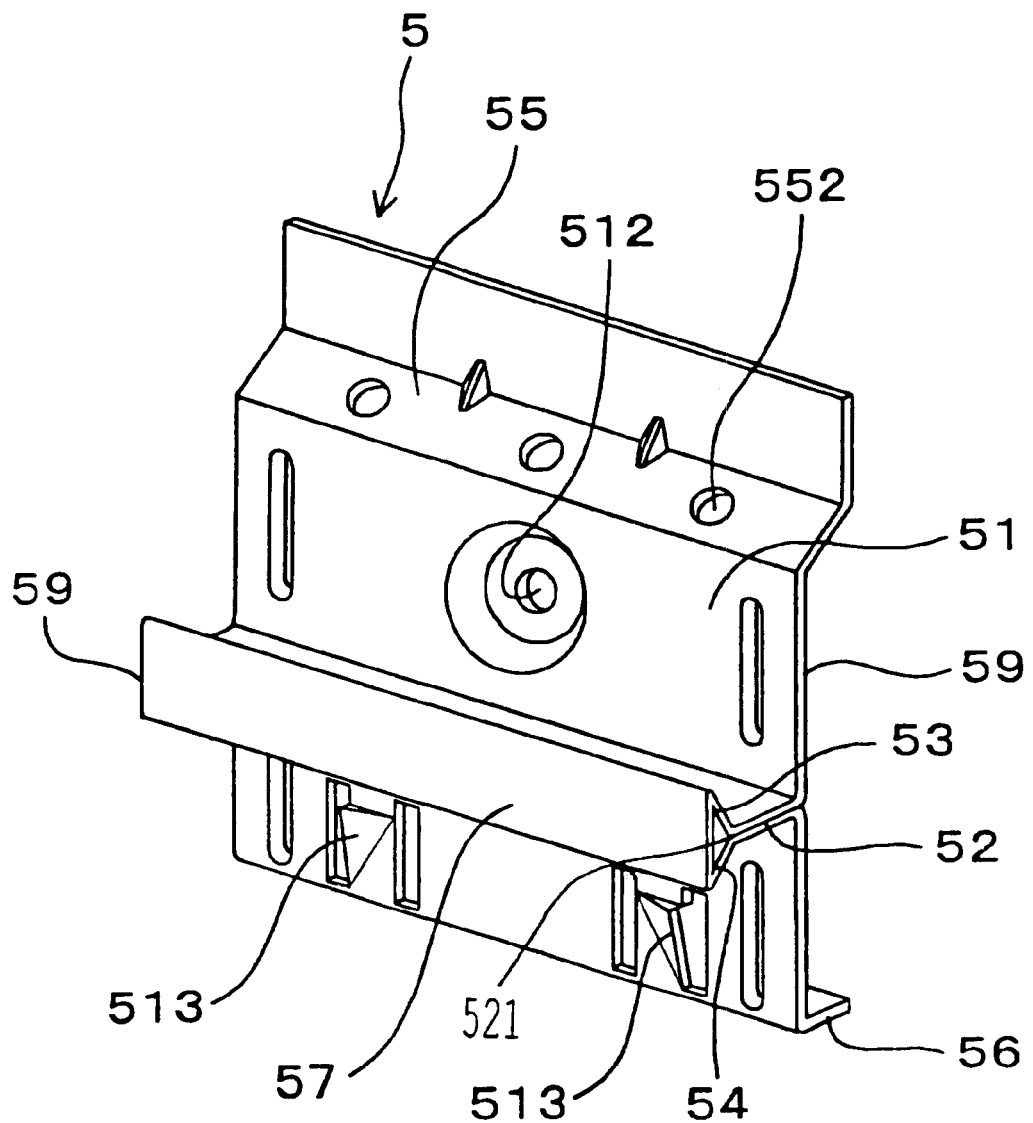
FIG. 5 is a perspective view of a securing metal fitting in the first embodiment.

As shown in FIG. 5 and FIG. 6, the securing metal fitting 5 has a fixing plate portion 51 abutting against a back surface 261 of an external wall panel 2 that is vertically arranged, and a support portion 52 forwardly erected over the full length of the fixing plate portion 51. In addition, from a front end 521 of the support portion 52, an upper panel engaging portion 53 that is bent in an oblique upward direction and a lower panel engaging portion 54 that is bent in an oblique downward direction are formed. A front flat plate 57 is continuously provided between tip ends of the upper panel engaging portion 53 and the lower panel engaging portion 54.

In addition, the fixing plate portion 51 has a step portion 55 retracted in an oblique backward direction at the top end and a bent portion 56 bent backwardly in approximate 90 degrees at the bottom end. In addition, a screw hole 512 for inserting a screw 519 for fixing the fixing plate portion 51 to the underlayment 3 is formed at the fixing plate portion 51. In addition, a through hole 552 is provided at the step portion 55 through which a nail and the like can be pierced for fixing the securing metal fitting 51 to the underlayment 3.

In engagingly locking the securing metal fitting 5 to the lower external wall panel 2, as shown in FIG. 6, the upper underlying tongue portion 22 is inserted in the space formed by the fixing plate portion 51, the support portion 52, and the lower panel engaging portion 54. In this engagingly locked state, the securing metal fitting 5 is fixed to the underlayment 3 by means of a screw 519.

In engagingly locking the upper external wall panel 2 to the securing metal fitting 5, as shown in FIG. 6, a lower engagement portion 211 of the lower overlying tongue portion 21 is inserted in the space formed by the fixing plate portion 51, support portion 52, and upper panel engaging portion 53 of the securing metal fitting 5. Then, a back surface of a surface bottom end 216 extending lower than the lower engagement portion 211 forwardly of the lower engagement portion 211 is abutted against the forward flat plate 57.

As shown in FIG. 5, a recutangular cantilever portion 513 that is cut and raised forwardly is provided downwardly of the fixing plate portion 51. The recutangular cantilever portion 513 cuts in a back surface 261 of the external wall panel 2 arranged downwardly, thereby preventing lateral movement and improving fixing force, as shown in FIG. 6.

A method of constructing an external wall construction 1 according to the present embodiment will be described with reference to FIG. 7 to FIG. 10. The following is directed to a description of the steps of a part of the external wall constructing method.

The external wall constructing method has the following first to third steps.

Figure 7:
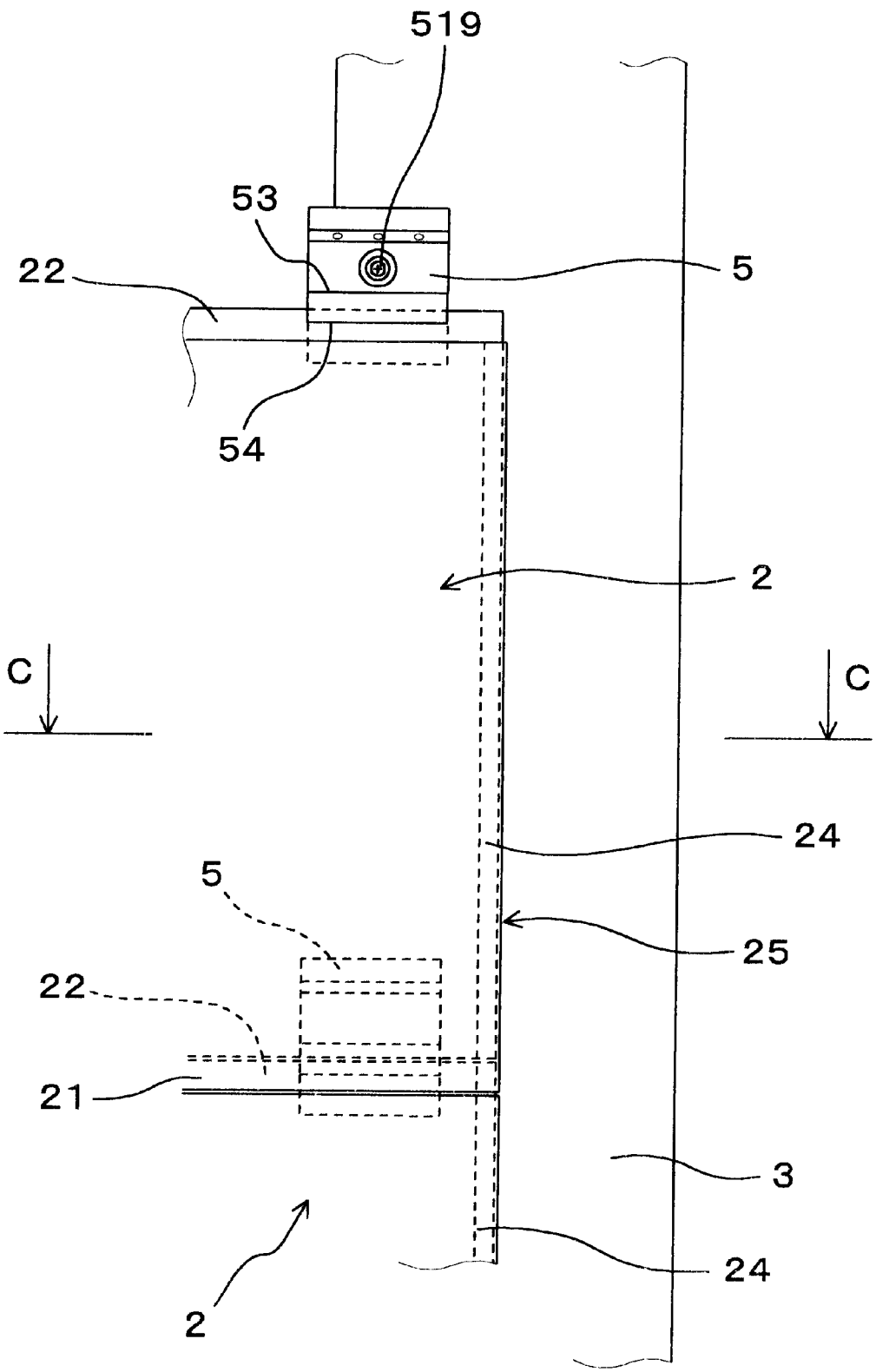
FIG. 7 is a front view showing a state when the first step of an external wall constructing method is terminated in the first embodiment.
Figure 10A:
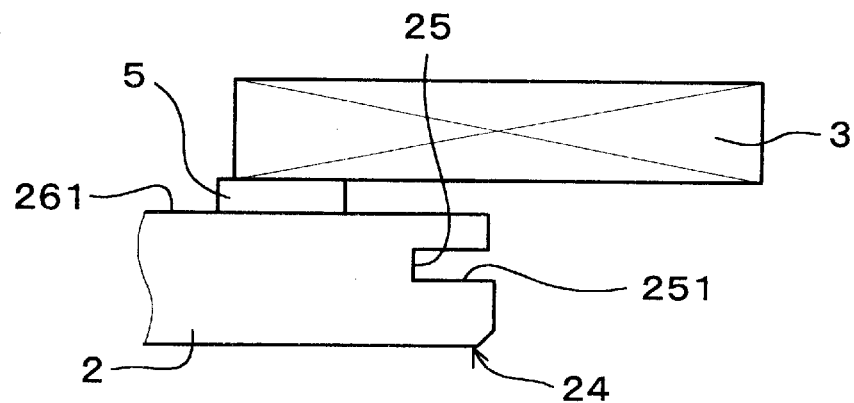
FIG. 10A is an illustrative cross section taken along line C—C in FIG. 7.

At the first step, as shown in FIG. 7 and FIG. 10A, a securing metal fitting 5 is installed at the upper underlying tongue portion 22 and lower overlying tongue portion 21 of the external wall panel 2, and the external wall panel 2 of the first column is mounted on the underlayment 3.

Figure 8:
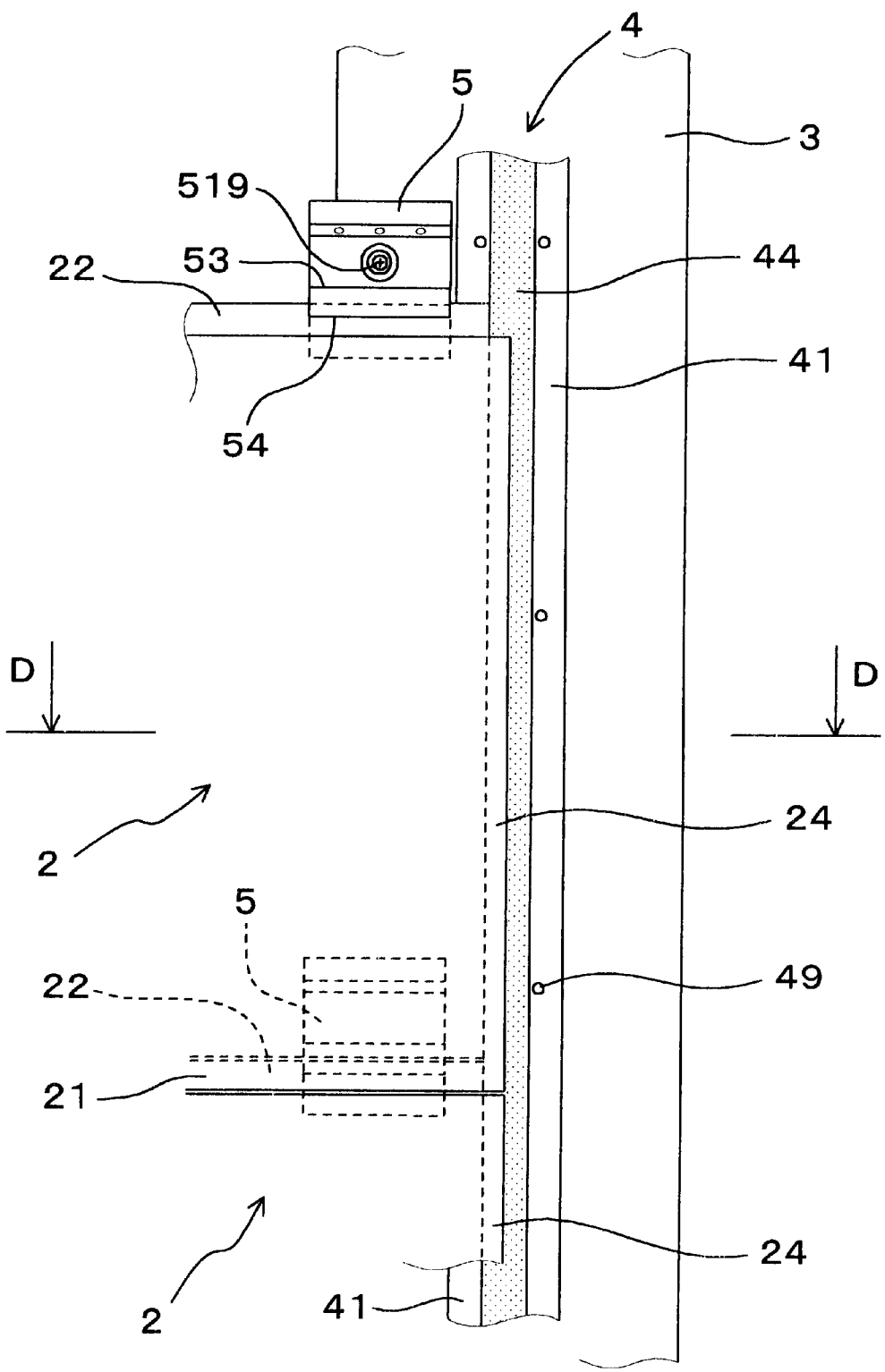
FIG. 8 is a front view showing a state when a second step of the external wall constructing method is terminated in the first embodiment.
Figure 10B:
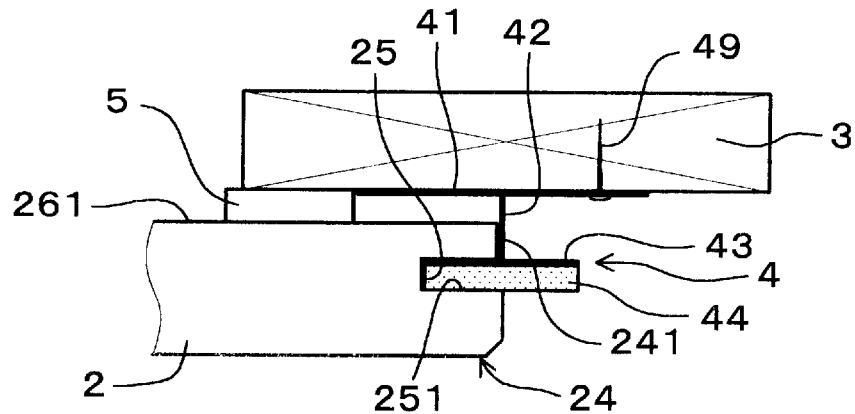
FIG. 10B is an illustrative cross section taken along line D—D in FIG. 8.

At the second step, as shown in FIG. 8 and FIG. 10B, at the right side portion 24 of the external wall panel 2 of the first column, the sealing fixture 4 is installed on the underlayment 3.

At this time, the front resilient material 44 and the front plate portion 43 of the sealing fixture 4 are engaged into the notched recess 25 at the right side portion 24 of the external wall panel 2.

The sealing fixture 4 is fixed to the underlayment 3 by striking a nail 49 towards the underlayment 3. In the case where the underlayment 3 is made of a steel frame, a screw is used in place of the nail 49.

Figure 10C:
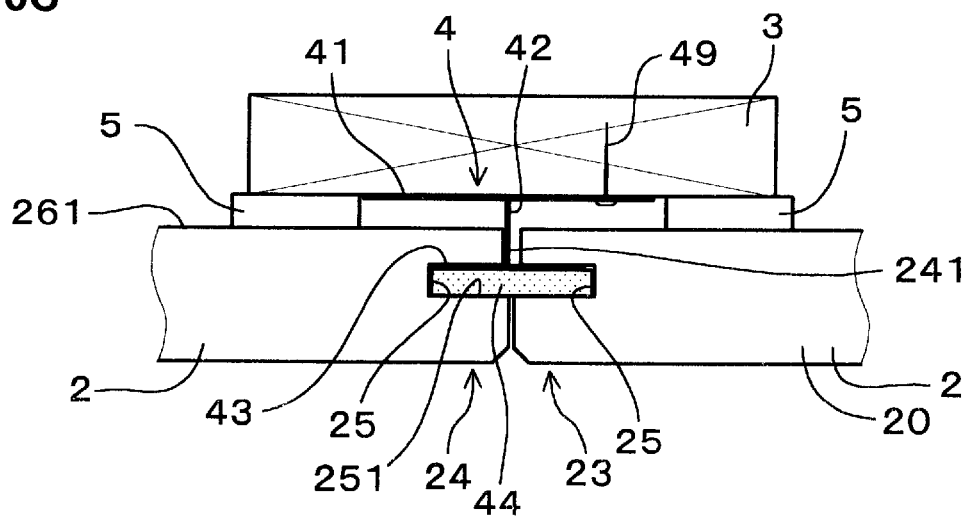
FIG. 10C is an illustrative cross section taken along line E—E of FIG. 9.

At the third step, as shown in FIG. 9 and FIG. 10C, the external wall panel 20 of the second column is mounted on the underlayment 3, wherein the securing metal fitting 5 is installed at the upper underlying tongue portion 22 and the lower overlying tongue portion 21. That is, the external wall panel 20 is mounted on the underlayment 3 so as to sandwich the sealing fixture 4 between the external wall panel 2 of the first column and the external wall panel 20 of the second column. At this time, the front plate portion 43 and the front resilient material 44 of the sealing fixture 4 are engaged into the notched recess 25 at the left side portion 23 of the external wall panel 20 of the second column.

The front resilient material 44 is provided in a state of being compressed to some extent by a curing tape. Then, by releasing the curing tape immediately before constructing, the front plate portion 43 and the front resilient material 44 can be easily engaged into the notched recess 25 of the external wall panel 2. After constructing, the front resilient material 44 in a compressed state gradually swells, and sufficiently extends into a space of the notched recess 25 of the external wall panel 2. In this manner, the front resilient material presses and seals the joint clearance portion 27 of the left and right external wall panels 2 from the rear side, and it is possible to prevent rainwater penetration reliably.

An advantageous effects of the present embodiment will be described here.

In the external wall construction 1, the front plate portion 43 and front resilient material 44 of the sealing fixture 4 arranged between the adjacent two external wall panels 2 are engaged into both of the notched recesss 25 of the two external wall panels 2. Thus, the front resilient material 44 comes into closely contact with both of the front inner surface 251 of the notched recess 25 at the two external wall panels 2 (FIG. 1).

Thus, the joint clearance portion 27 at the surface side of the left and right external wall panels 2 is sealed from the rear side. Therefore, from the joint clearance portion 27, rainwater does not penetrate into the inner portion of the external wall construction 1 such as the back surface 261 of the external wall panel 2, the underlayment 3, and the like.

In this way, according to the external wall construction 1, the rainwater can be reliably prevented from penetrating into the external wall construction 1, and thus the external wall panel 2, underlayment 3 and the like can be reliably prevented from being corroded or degraded.

In particular, the sealing fixture 4 is continuously arranged over the vertical direction of the external wall construction 1, whereby rainwater penetration can be prevented more reliably without giving a room for rainwater penetration.

In addition, in the sealing fixture 4, the base plate portion 41 is fixed to the underlayment 3 and the rising plate portion 42 abuts against a side face 241 of the external wall panel 2. Thus, the displacement in the lateral direction of the external wall panel 2 can be prevented.

Further, during construction as well, as described above, the rising plate portion 42 is abutted against the side face 241 of the external wall panel 2 of the first column, thereby mounting the sealing fixture 4. Thus, the lateral alignment of the sealing fixture 4 can be easily performed (FIG. 10B).

Furthermore, the front resilient material 44 is a foam body with closed cells that consist of EPDM or the like, therefore rainwater penetration can be prevented more reliably.

Furthermore, the sealing fixture 4 is continuously arranged over the vertical direction of the external wall construction 1, whereby rainwater penetration can be prevented more reliably without giving a room for rainwater penetration.

As described, according to the present embodiment, there can be provided an external wall construction capable of preventing water penetration into the construction reliably; and a sealing fixture, an external wall panel and an external wall constructing method, which are used for the construction.

Embodiment 2

Figure 12:
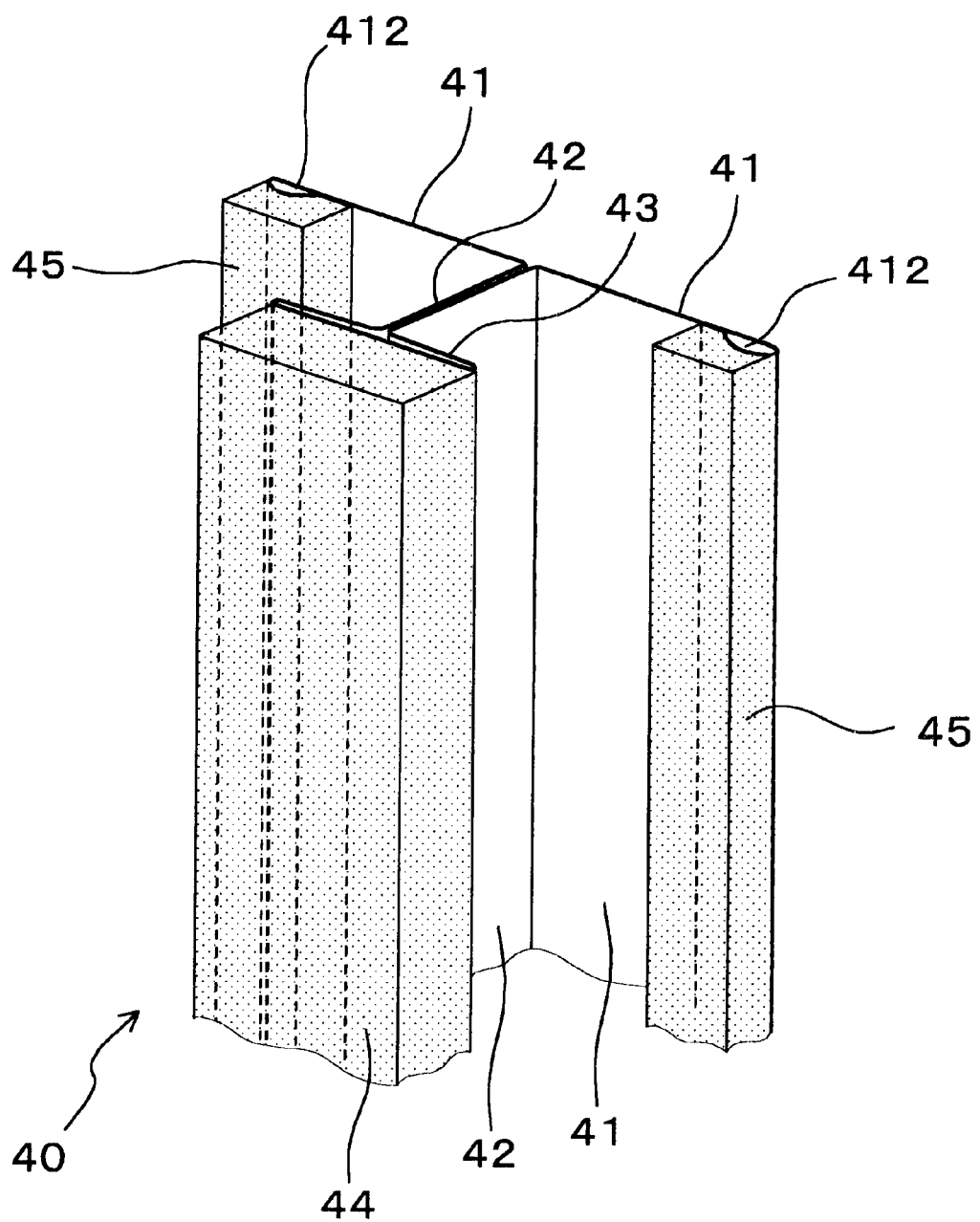
FIG. 12 is a perspective view of a sealing fixture in the second embodiment.

As shown in FIG. 11 to FIG. 13, an external wall construction 12 having the rear resilient material 45 arranged on the front surface of the base plate portion 41 of the sealing fixture 4 is provided in this embodiment.

That is, in the sealing fixture 40, as shown in FIG. 12, the rear resilient material 45 is pasted at the front face of the left and right end portions 412 of the base plate portion 41 along the longitudinal direction.

The rear resilient material 45 is in closely contact with the back surface 26 of the external wall panel 2 as shown in FIG. 11 and FIG. 13.

The rear resilient material 45 is made of the same material as the front resilient material 44 shown in the embodiment 1.

In constructing the external wall construction 12, at the second step (refer to FIG. 10B) and the third step (refer to FIG. 10C) of the external wall constructing method shown in the embodiment 1, the rear resilient material 45 is brought into closely contact with the external wall panel 2 as described below.

That is, at the second step, the rear resilient material 45 and base plate portion 41 of the sealing fixture 4 are inserted into between the back surface 261 of the external wall panel 2 of the first column and the underlayment 3, and the rear resilient material 45 is brought into closely contact with the back surface 261 of the external wall panel 2. In addition, at the third step, the back surface 261 of the external wall panel 20 of the second column is brought into closely contact with the rear resilient material 45 of the sealing fixture 4.

The others are similar to embodiment 1.

According to the external wall construction 12, as shown in FIG. 11 and FIG. 13, a water passage 11 is formed by the base plate portion 41, the rear resilient material 45, the rising plate portion 42, the front plate portion 43 of the sealing fixture 40, and the external wall panel 2.

Therefore, if water penetration cannot be prevented by the front resilient material 44 of the front plate portion 43 and rainwater penetrates from the joint clearance portion 27 of the external wall panel 2, such rainwater can be dammed by the rear resilient material 45. Then, the rainwater drops downwardly through the water passage 11, and does not penetrate into the external wall construction 12.

In this manner, there can be provided an external wall construction capable of preventing water penetration into the construction more reliably.

Otherwise, an advantageous effect similar to embodiment 1 is provided.

Embodiment 3

The present embodiment describes an example of an external wall construction 13 in which a base plate portion 41 of a sealing fixture 4 is superimposed backwardly of a securing metal fitting 5, thereby fixing the sealing fixture 4 to an underlayment 3 together with the securing metal fitting 5.

The securing metal fitting 5 is fixed to the underlayment 3 by means of a screw 519 together with the sealing fixture 4.

The others are similar to embodiment 1.

Figure 14:
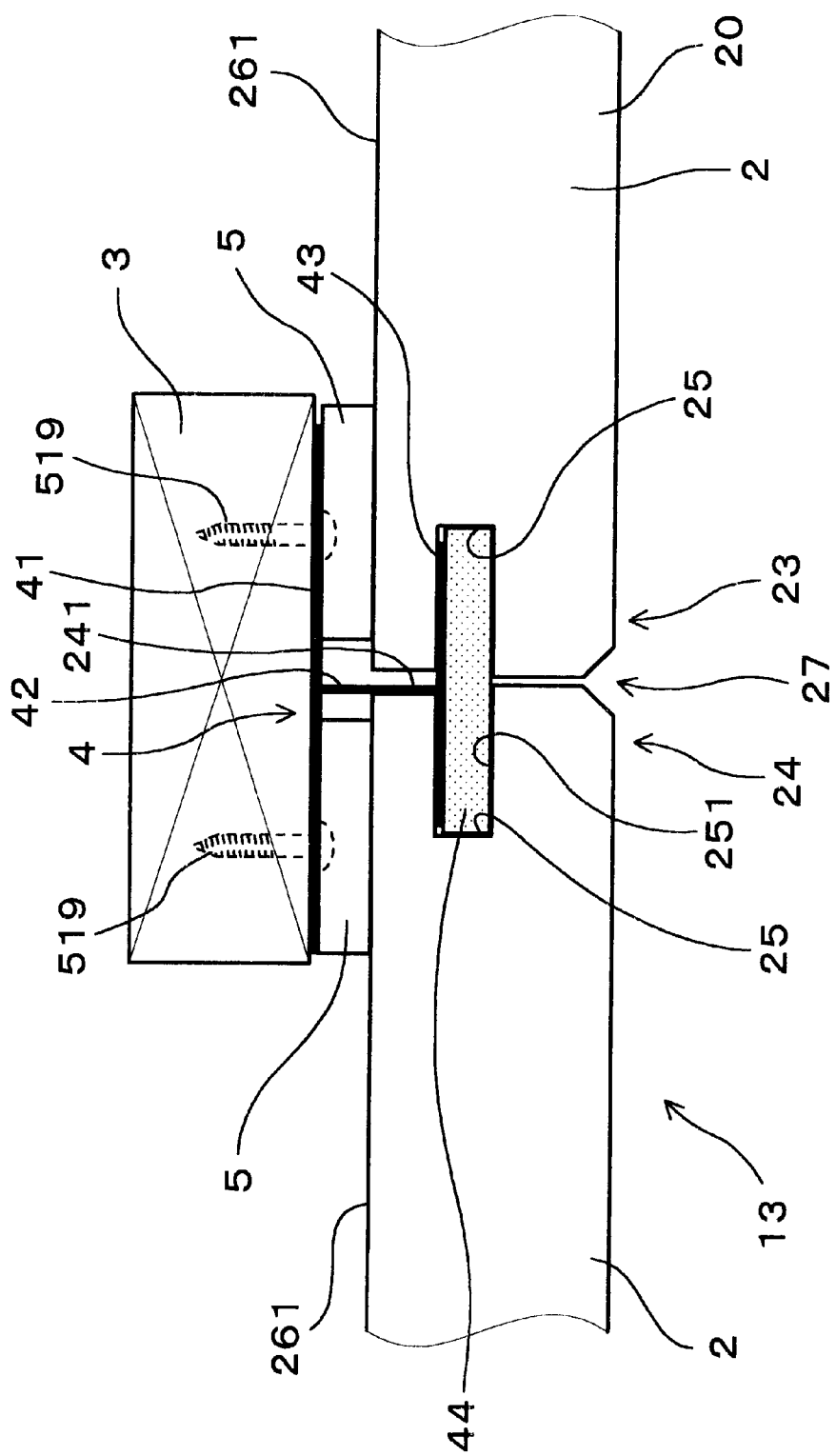
FIG. 14 is a lateral cross section of an external wall construction in a third embodiment.

In this case, a space for fixing the securing metal fitting 5 can be reduced. Therefore, as shown in FIG. 14, even in the case where a width of the underlayment 3 is small, the securing metal fitting 5 can be easily and reliably fixed.

For example, in the case where the underlayment 3 is a vertical furring strip having a small width, the securing metal fitting 5 can be easily and reliably fixed to the underlayment 3.

Otherwise, an advantageous effect similar to embodiment 1 is provided.

Embodiment 4

Figure 15:
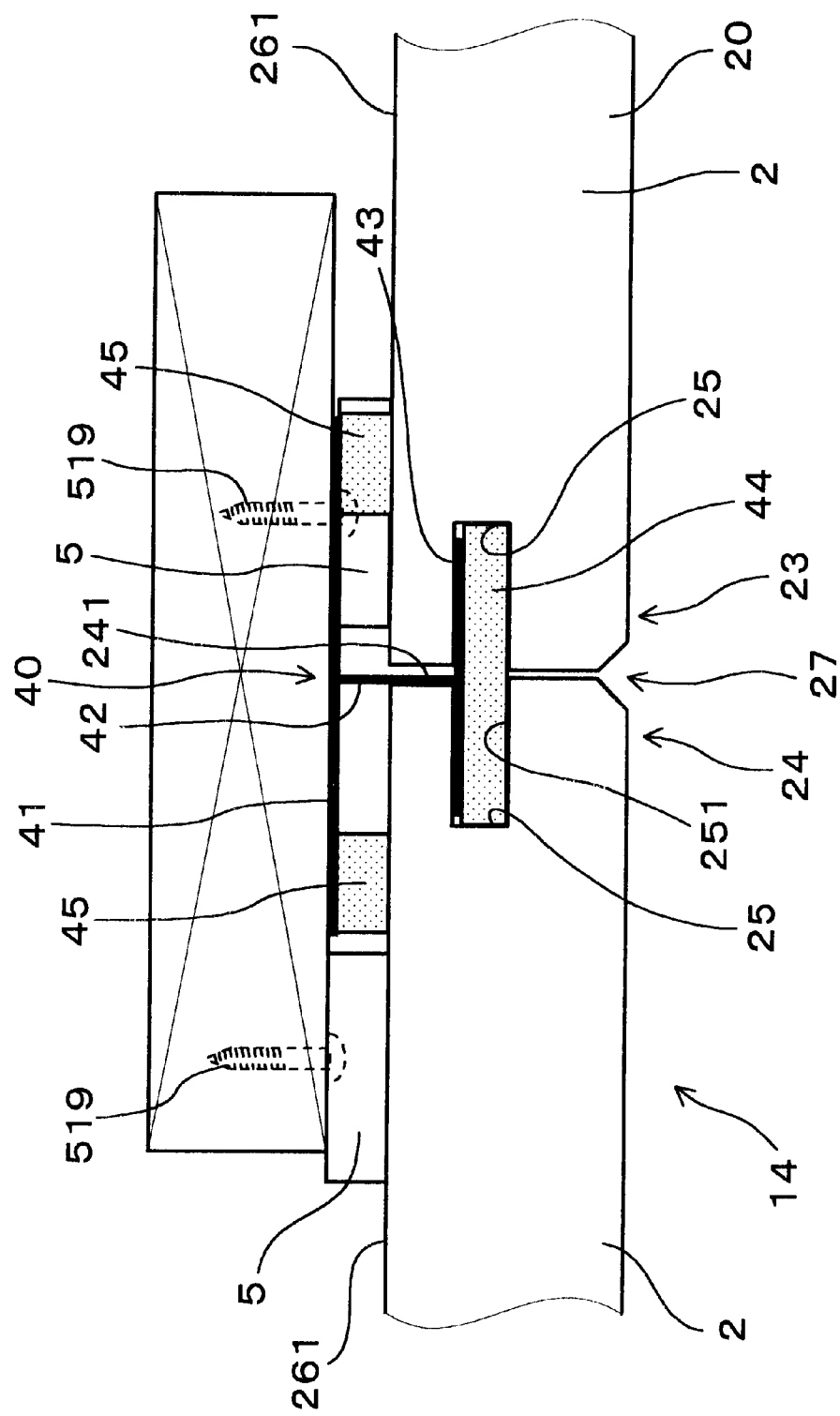
FIG. 15 is a lateral cross section of an external wall construction in a fourth embodiment.

As shown in FIG. 15, the present embodiment describes an example of an external wall construction 14 in which a sealing fixture 40 (FIG. 12) wherein a rear resilient material 45 is applied on the front face of the base plate portion 41 in a longitudinal direction, and the securing metal fitting 5 is installed to be superimposed at the front face of the base plate portion 41 of the sealing fixture 40.

In this case, the left securing metal fitting 5, i.e., the securing metal fitting 5 installed on the underlayment 3 in advance is not superimposed on the front face of the base plate portion 41 of the sealing fixture 40.

The others are similar to embodiment 2.

In this case, it is possible to prevent water penetration into the external wall construction 14, to reduce the space for fixing the securing metal fitting 5, and furthermore, to improve efficiency in constructing.

Otherwise, an advantage effect similar to embodiment 2 is provided.

Embodiment 5

Figure 16:
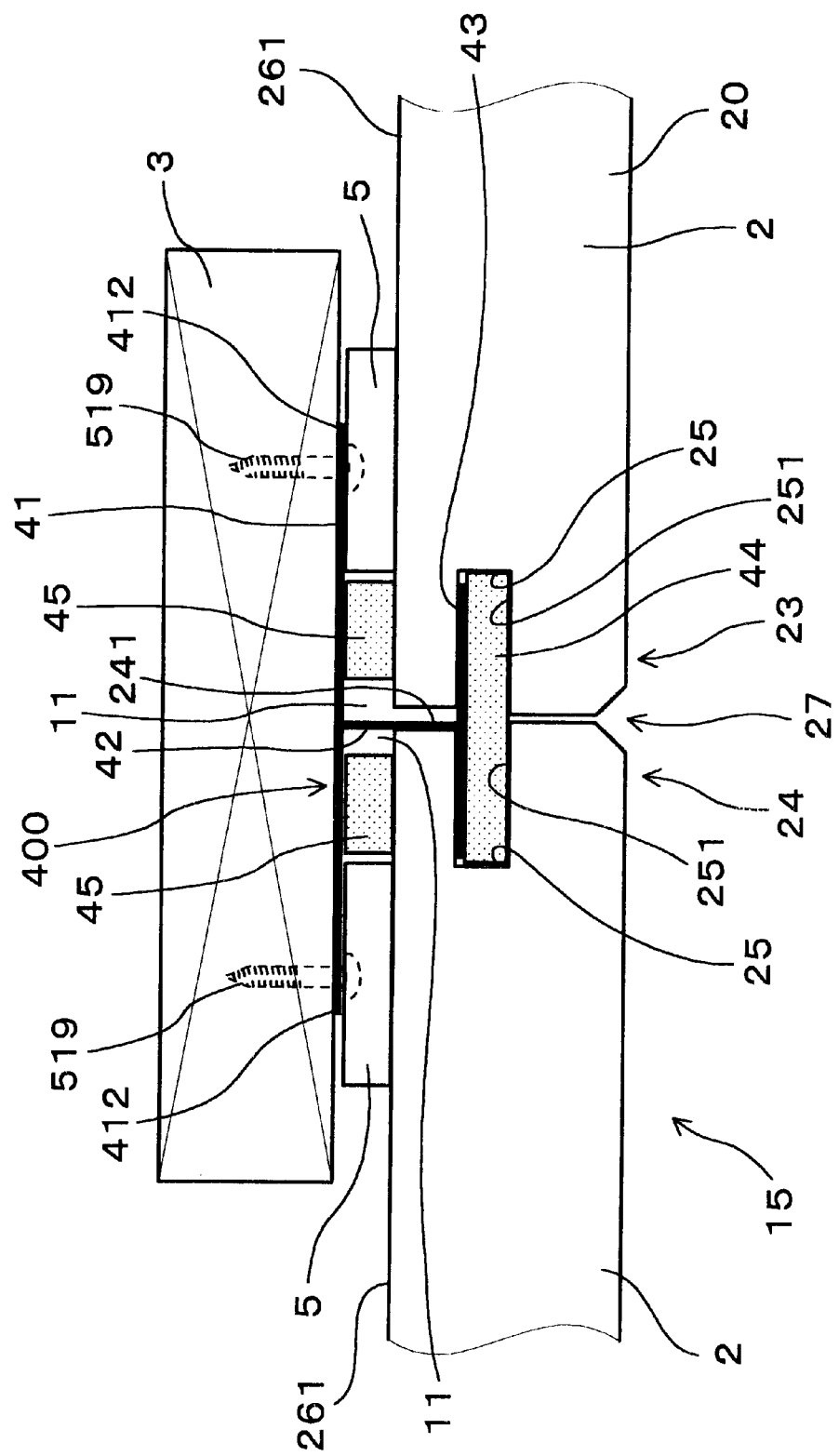
FIG. 16 is a lateral cross section of an external wall construction in a fifth embodiment.

The present embodiment describes an example of an external wall construction 15 in which a sealing fixture 400 wherein the rear resilient material 45 applied on the front face of the base plate portion 41 over the longitudinal direction is close to the rising plate portion 42 is used, as shown in FIG. 16, and the securing metal fitting 5 is installed to be superimposed on the front face of the base plate portion 41 of the sealing fixture 400.

The others are similar to embodiment 2.

In this case, the claming fixture 5 at the left and right sides of the sealing fixture 400 can be installed to be superimposed on the front face of the base plate portion 41 of the sealing fixture 400. That is, during construction, when the external wall panel 2 of the first column is fixed to the underlayment 3 together with the securing metal fitting 5, an end portion 412 of the base plate portion 41 of the sealing fixture 400 can be fixed to be slid and inserted between the underlayment 3 and the securing metal fitting 5 installed at the surface of the underlayment 3.

Otherwise, an advantageous effect similar to embodiment 2 is provided.

Embodiment 6

The present embodiment describes an example of an external wall construction 16 in which the left side portion 23 and right side portion 24 of the external wall panel 2 are fastened at the underlayment 3 by means of the sealing fixture 4 as shown in FIG. 17.

In the external wall construction 16, at the left and right joint portions of the external wall panel 2, the securing metal fitting is not used and only the sealing fixture 4 is installed. Then, water penetration into the external wall construction is prevented by the sealing fixture 4, and the left and right external wall panels 2 are jointed by the sealing fixture 4.

As shown in FIG. 17, the securing metal fitting 5 is installed at the underlayment 30 such as a vertical furring strip that is different from the underlayment 3 to which the sealing fixture 4 is fixed, and the securing metal fitting 5 fix the external wall panel 2 to the underlayment 30.

The others are similar to embodiment 1.

In this case, as described above, the sealing fixture 4 can play two roles, i.e., prevention of water penetration into the external wall construction 16 and jointing of the left and right external wall panels simultaneously. In this case, a fastening force of the left and right external wall panels 2 and 20 by the sealing fixture 4 is sufficiently large.

In addition, since it is sufficient if the width of the underlayments 3 and 30 have the width of the sealing fixture 4 or the securing metal fitting 5, it is efficient when the external wall panel is constructed at a framework in which a plurality of underlayments 3 and 30 having small widths are installed.

Otherwise, an advantageous effect similar to embodiment 1 is provided.

Embodiment 7

Figure 18:
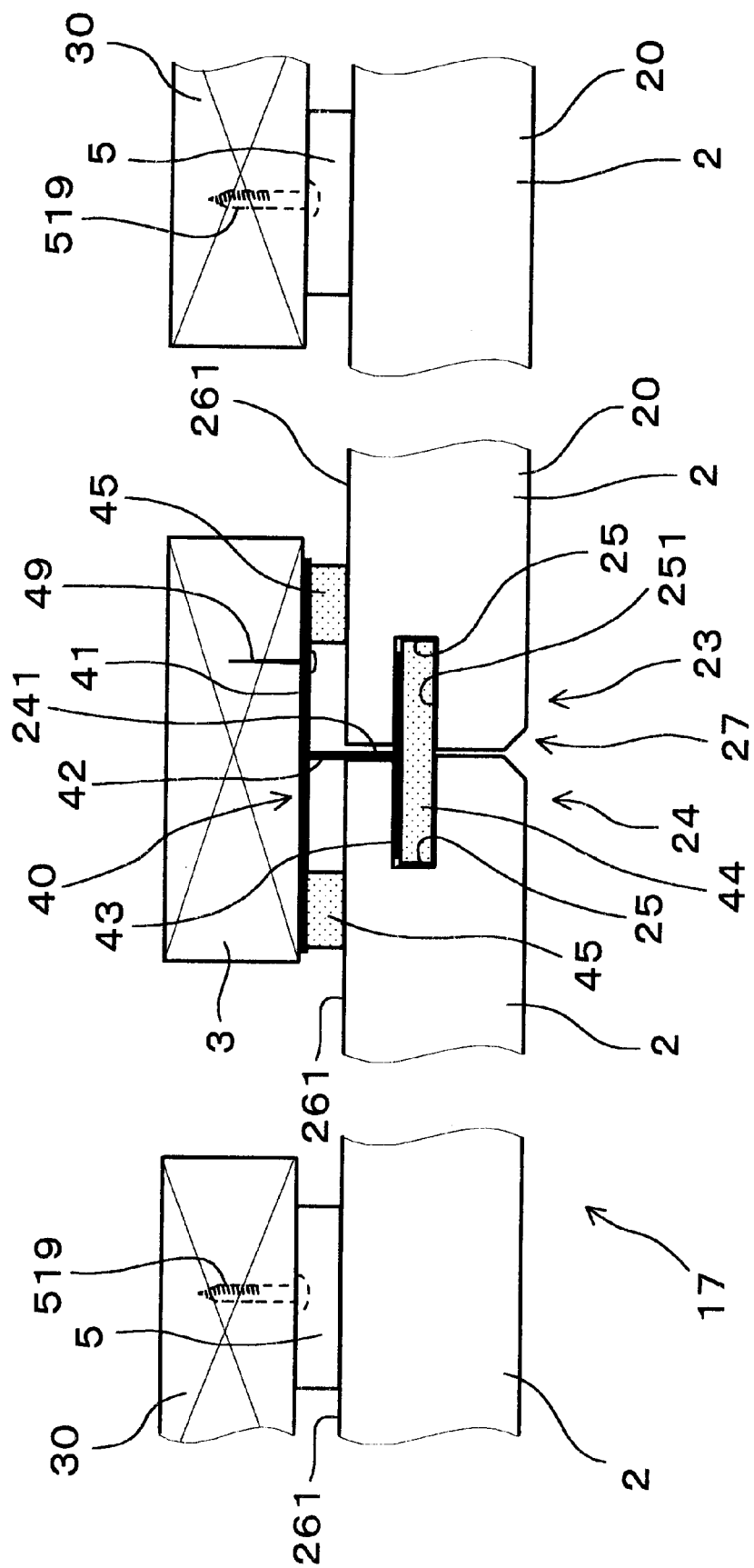
FIG. 18 is a lateral cross section of an external wall construction in a seventh embodiment.
Figure 19:
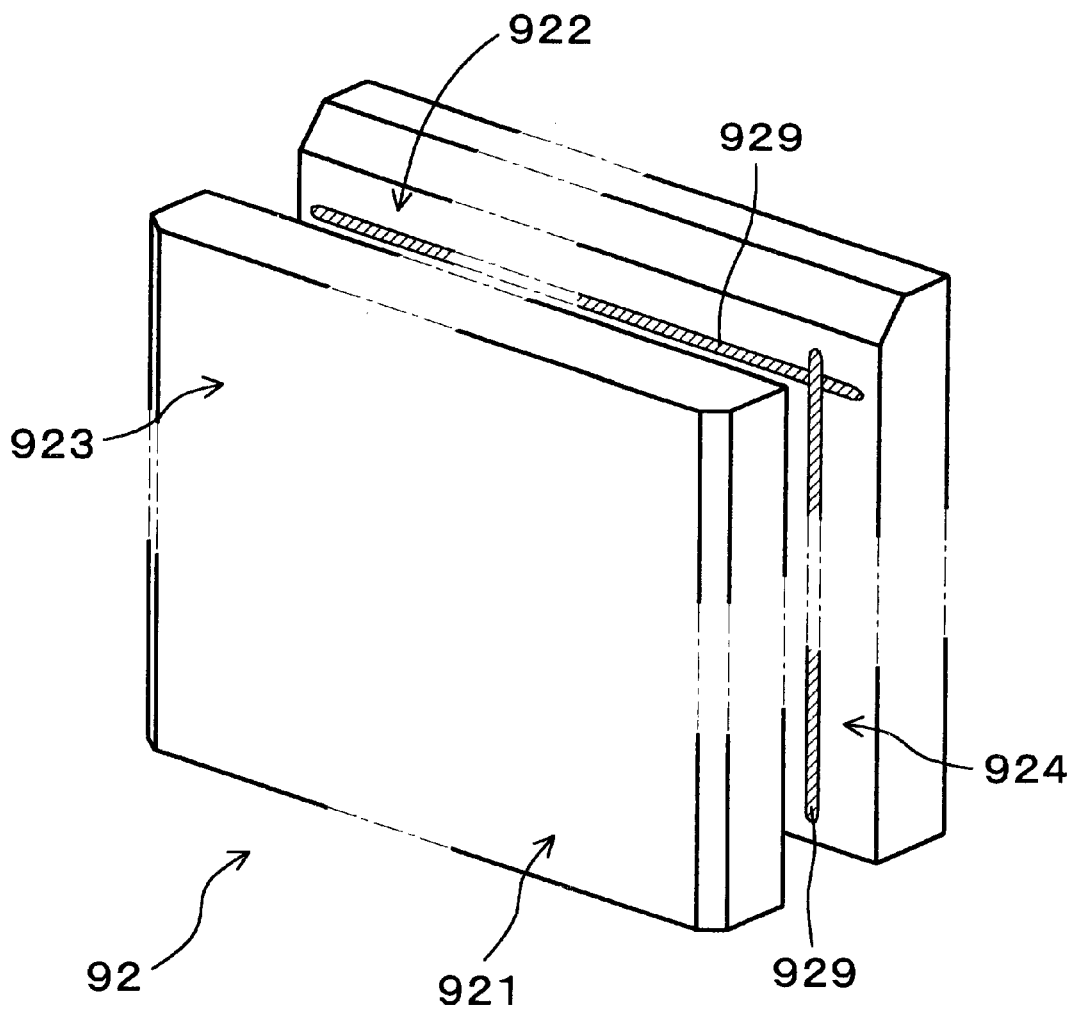
FIG. 19 a perspective view of an external wall construction in a conventional example.
Figure 20:
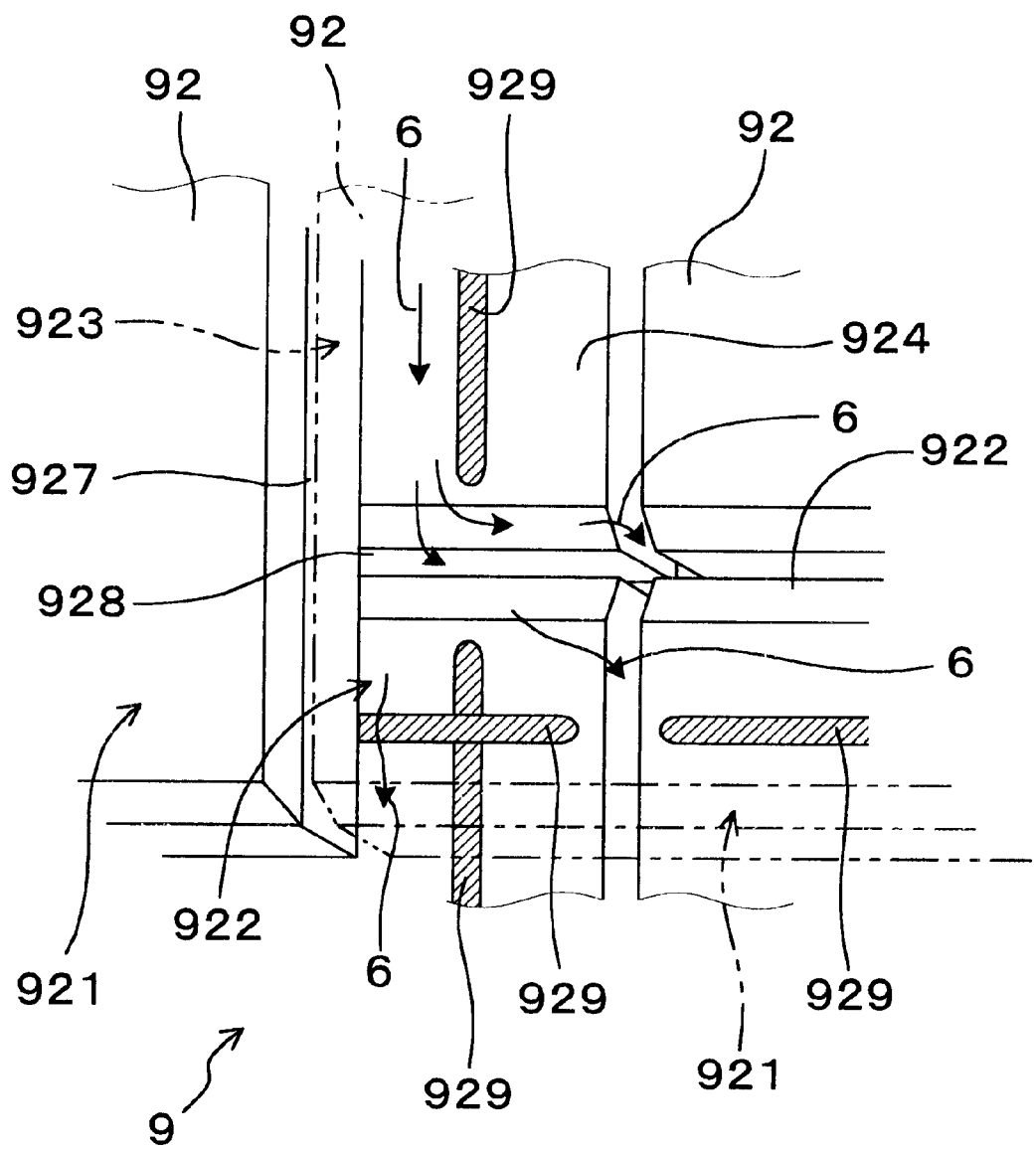
FIG. 20 is an illustrative view illustrating problems with the external wall construction in the conventional example.

The present embodiment describes an example of an external wall construction 17 in which the left side portion 23 and right side portion 24 of the external wall panel 2 are fastened in the same way as embodiment 6 at the underlayment 3 by a sealing fixture 40 (FIG. 12) shown in embodiment 2, as shown in FIG. 18.

The others are similar to embodiment 6.

In this case, in addition to an advantageous effect similar to embodiment 6, an advantageous effect similar to embodiment 2 is also provided.

Obviously, numerous modifications and variations of the present invention are possible in light of the above teachings. It is therefore to be understood that, within the scope of the appended claims, the invention may be practiced otherwise than as specifically described here.

What is claimed as new and desired to be secured by letters patent of the United States is:

1. An external wall construction, comprising:

an underlayment;

right and left external wall panels mounted on the underlayment;

a securing metal fitting installed at each of upper and lower side portions of the right and left external wall panels;

a notched recess formed on left and right side portions of the right and left external wall panels, respectively, along a vertical direction;

a sealing fixture arranged between the right and left external wall panels and continuously arranged over the vertical direction of the external wall construction, wherein the sealing fixture includes:
 a base plate portion fixed to the underlayment;
 a rising plate portion erected at the base plate portion;
 a front plate portion arranged at the rising plate portion;
 a front resilient material provided at a front face of the front plate portion, wherein the front resilient material and the front plate portion are engaged in the notched recess of the right and left external wall panel, and wherein the front resilient material comes into close contact with both front inner surfaces of the notched recess of the right and left external wall panels; and rear resilient materials disposed on a front face of the base plate portion, wherein each of the rear resilient materials is in close contact with a back surface of either the right external wall panel or the left external wall panel.

2. The external wall construction according to claim 1, wherein the front resilient material and the rear resilient material are made from foam material.

3. The external wall construction according to claim 1, wherein the base plate portion is sandwiched between a rear portion of the securing metal fitting and the underlayment to secure the sealing fixture to the underlayment together with the securing metal fitting.

4. The external wall construction according to claim 1, wherein the left side portion and the right side portion of the right and left external wall panels, respectively, are fastened to the underlayment via the sealing fixture.

5. A sealing fixture used for an external wall construction, wherein the external wall construction includes right and left external wall panels each having a notched recess formed on left and right side portions thereof, respectively, along a vertical direction, the right and left external wall panels being fixed to an underlayment by installing a securing metal fitting on each of upper and lower side portions of the right and left external wall panels, the sealing fixture being arranged between the right and left external wall panels and continuously arranged over the vertical direction of the external wall construction, the sealing fixture comprising:

a base plate portion fixed to the underlayment;

a rising plate portion erected at the base plate portion;

a front plate portion arranged at the rising plate portion; and a front resilient material provided at a front face of the front plate portion, wherein the front resilient material and the front plate portion are formed to be engaged in a notched recess of the external wall panels, and wherein the front resilient material comes into close contact with both front inner surfaces of the notched recess of the right and left external wall panels; and rear resilient materials disposed on a front face of the base plate portion, wherein each of the rear resilient materials is in close contact with a back surface of either the right external wall panel or the left external wall panel.

6. The sealing fixture according to claim 5, wherein the front resilient material and the rear resilient material are made from foam material.

7. The external wall construction according to claim 1, wherein:

the left external wall panel has a notched portion in a right side face thereof and the right external wall panel has a notched portion in a left side face thereof to form the notched recess along the vertical direction; and the notched recess is formed so that the front resilient material and the front plate portion of the sealing fixture are engaged therein.

8. An external wall constructing method for constructing an external wall construction, the method comprising the steps of:

installing a securing metal fitting at each of upper and lower side portions of external wall panels of a first column;

installing either right or left external wall panels of the first column on an underlayment;

installing a sealing fixture on the underlayment at either a left side portion or a right side portion of either the right or left external wall panels of the first column;

disposing either left or right external wall panels of a second column on the underlayment so that the sealing fixture is sandwiched between either the right or left external wall panels of the first column and either the left or right external wall panels of the second column and so that the sealing fixture is arranged continuously over a vertical direction of the external wall construction, wherein the securing metal fitting is installed at upper and lower side portions of the external wall panels of the second column;

disposing a front resilient material so as to engage a front plate portion of the sealing fixture in a notched recess of the right and left external wall panels of both the first and second columns and so that the front resilient material comes into close contact with both front inner surfaces of the notched recess of the right and left external wall panels of both the first and second columns;

disposing the sealing fixture so that a rear resilient material and the base plate portion are between a back surface of either the right or left external wall panels of the first column and the underlayment and so that the rear resilient material is in close contact with the back surface of either the right or left external wall panels of the first column; and disposing either the left or right external wall panels of the second column so that the rear surface of either the left or right external wall panels of the second column is in close contact with the rear resilient material of the sealing fixture.

9. The external wall constructing method according to claim 8, further comprising installing the base plate portion of the sealing fixture so as to be superimposed backwardly of the securing metal fitting, whereby the sealing fixture and the securing metal fitting are fixed to the underlayment at the same time.

* * * * *